March 19, 1957 R. BARNARD 2,785,909
STEERING MECHANISM FOR VEHICLES
Filed Sept. 3, 1954 7 Sheets-Sheet 2
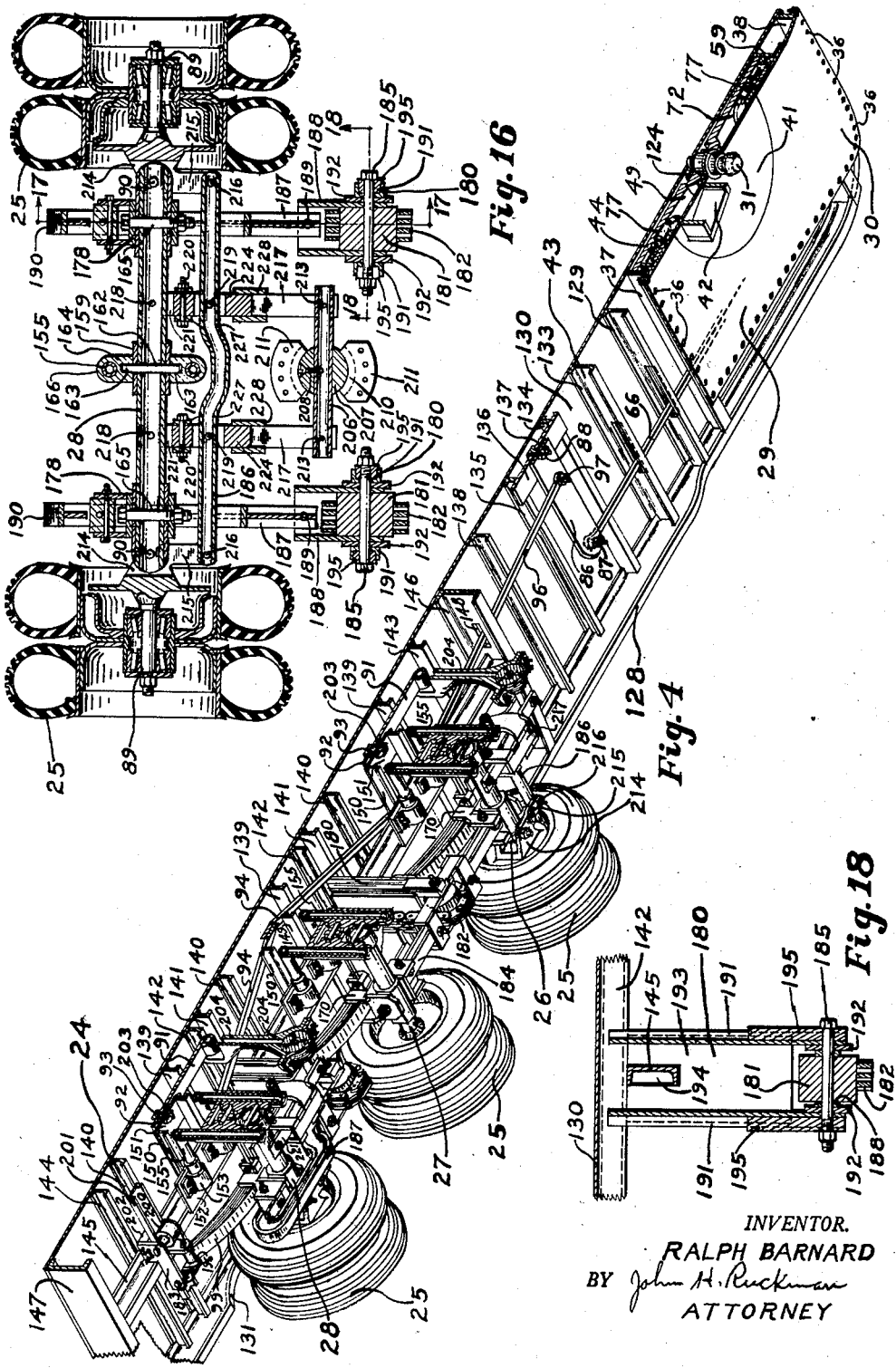
INVENTOR.
RALPH BARNARD
BY John H. Ruckman
ATTORNEY

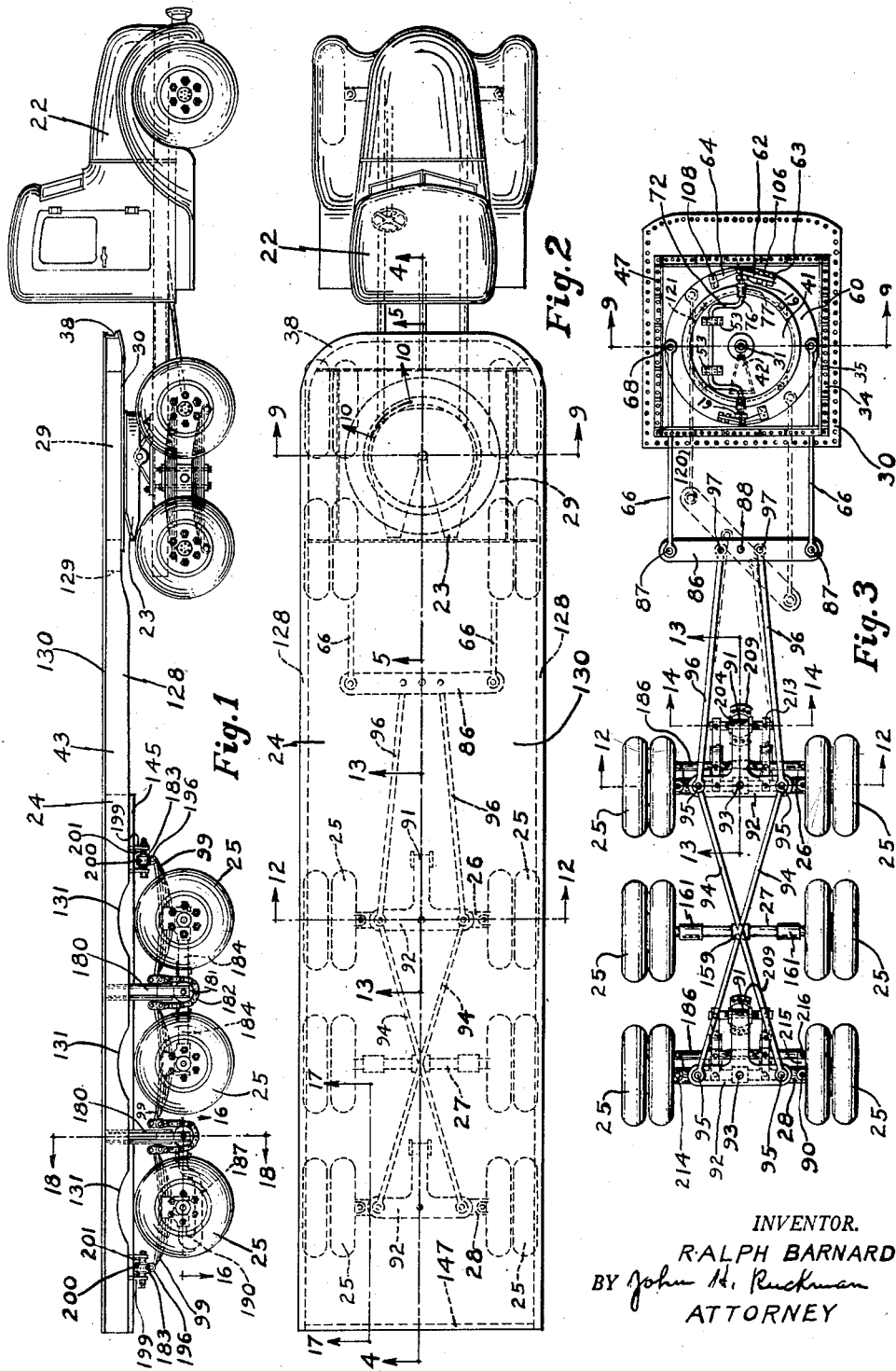

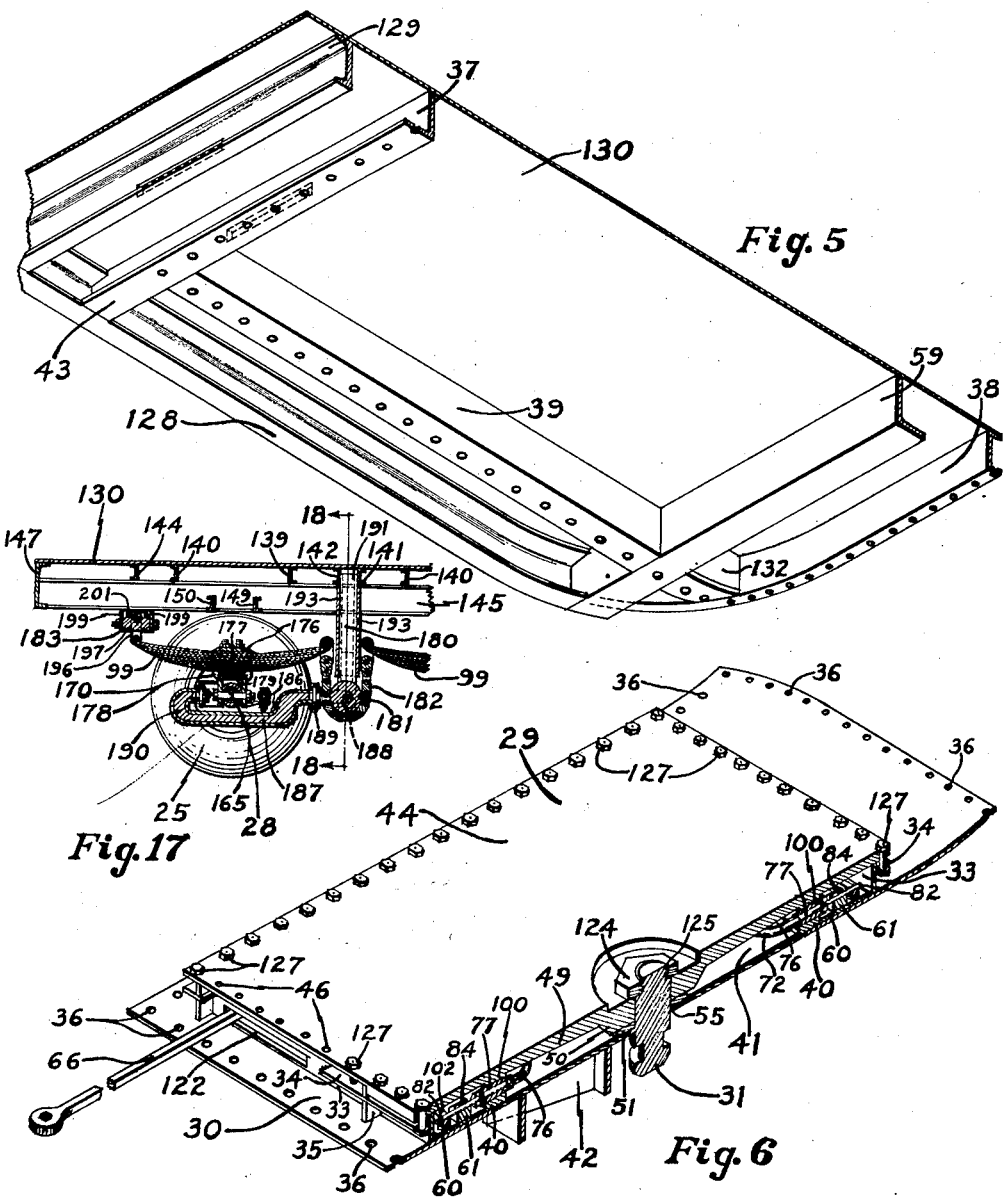

March 19, 1957 R. BARNARD 2,785,909
STEERING MECHANISM FOR VEHICLES
Filed Sept. 3, 1954 7 Sheets-Sheet 4
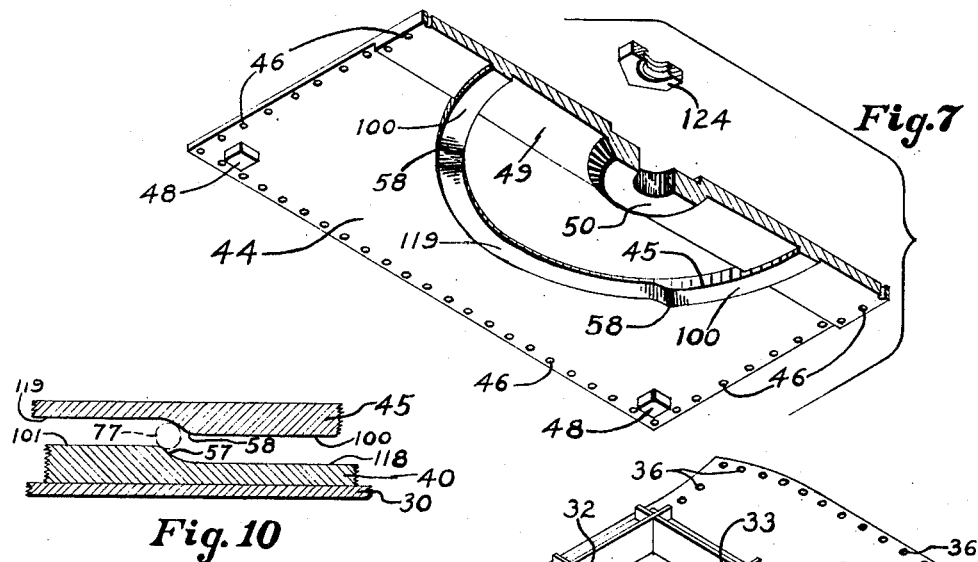
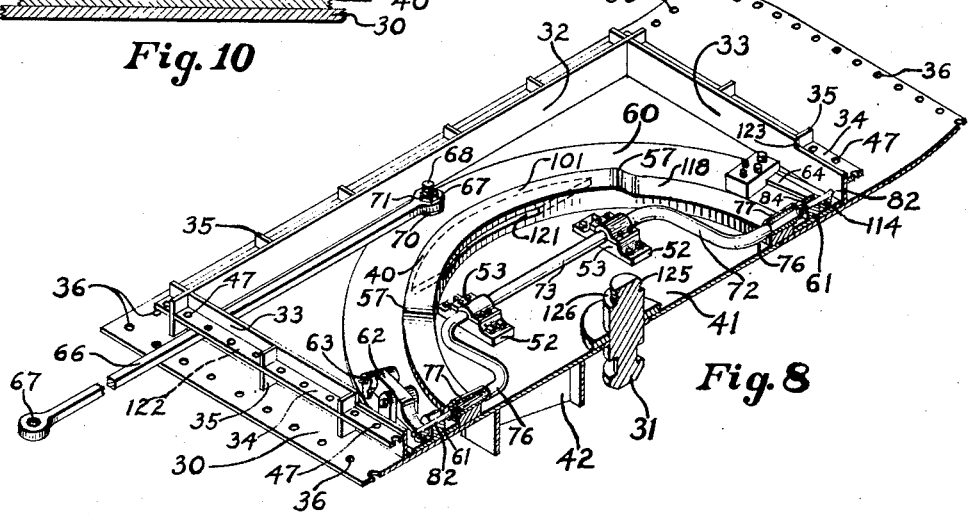
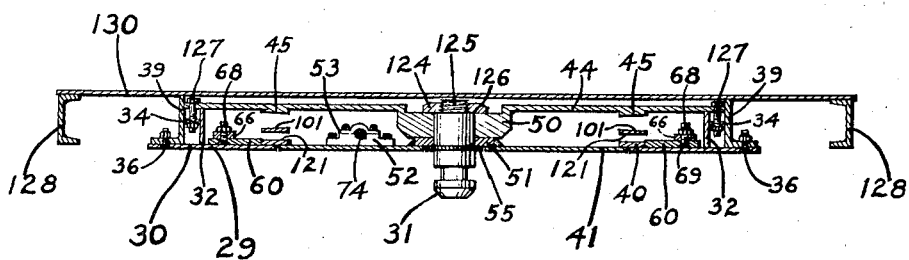
INVENTOR.
RALPH BARNARD
BY John H. Ruckman
ATTORNEY

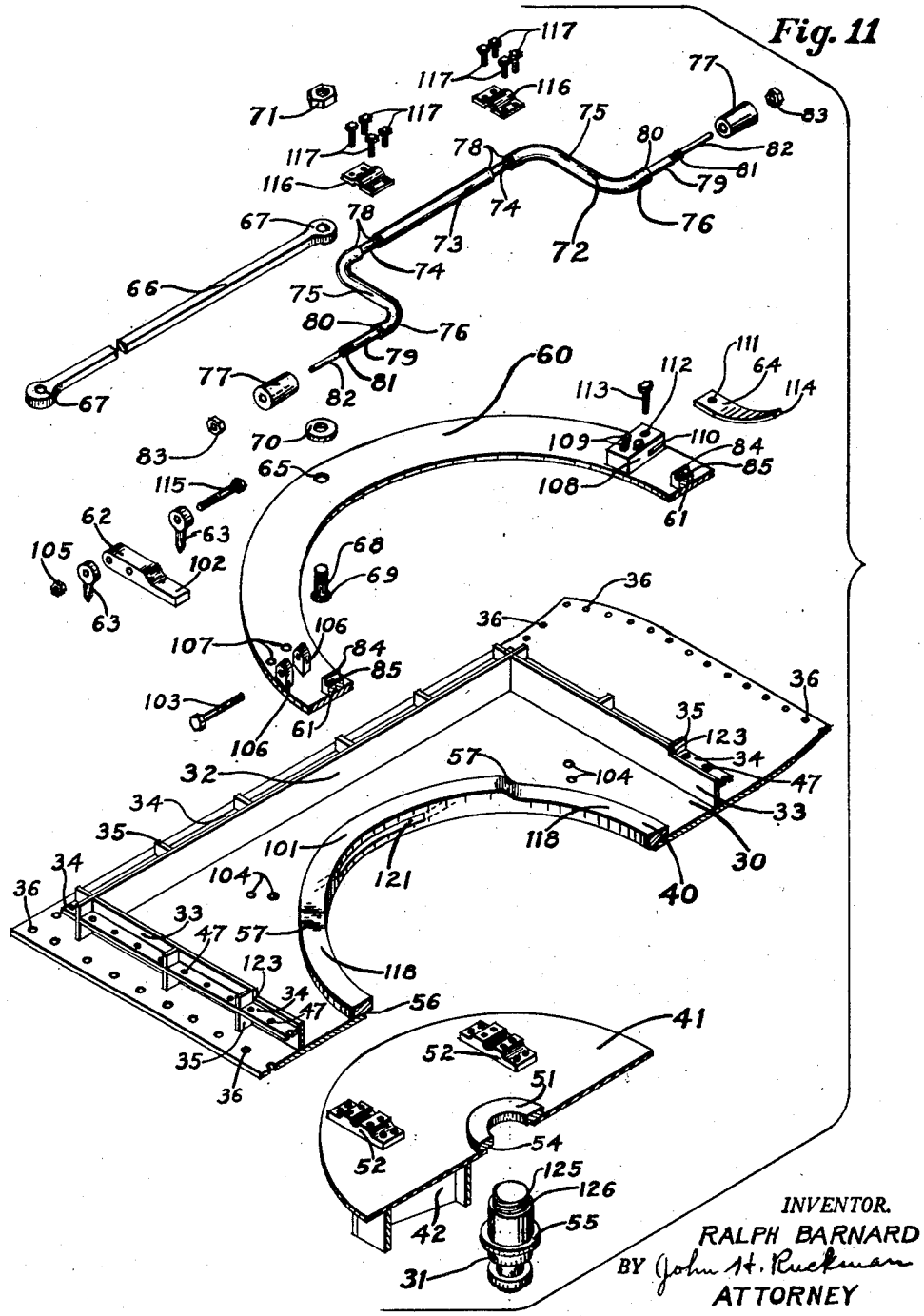

March 19, 1957 R. BARNARD 2,785,909
STEERING MECHANISM FOR VEHICLES
Filed Sept. 3, 1954 7 Sheets-Sheet 6
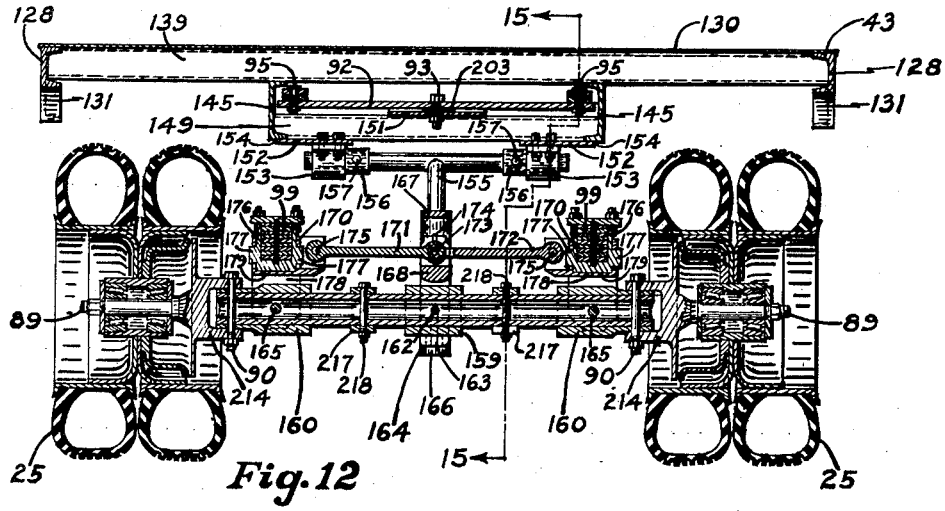
Fig. 12
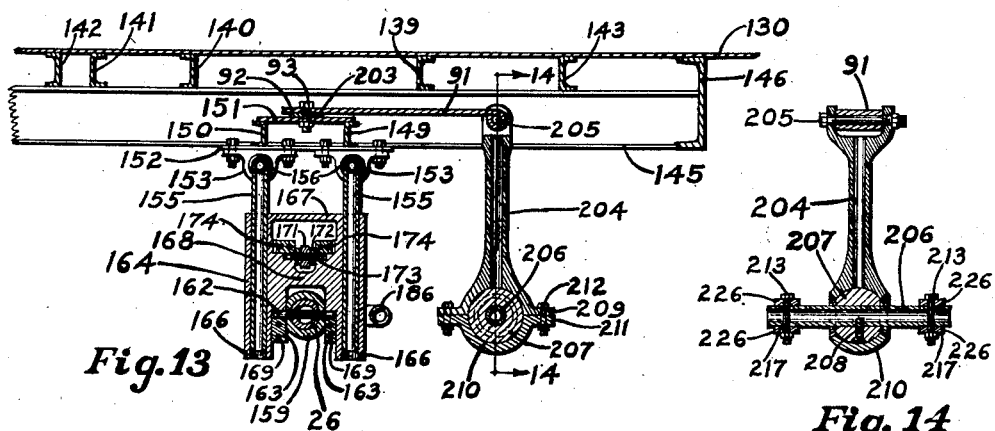
Fig. 13
Fig. 14
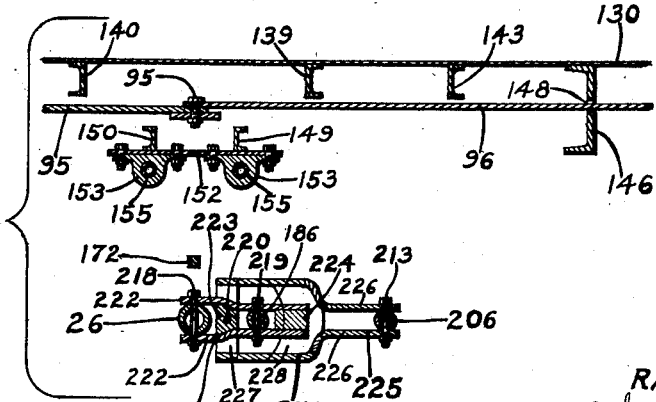
Fig. 15
INVENTOR.
RALPH BARNARD
BY John H. Ruckman
ATTORNEY

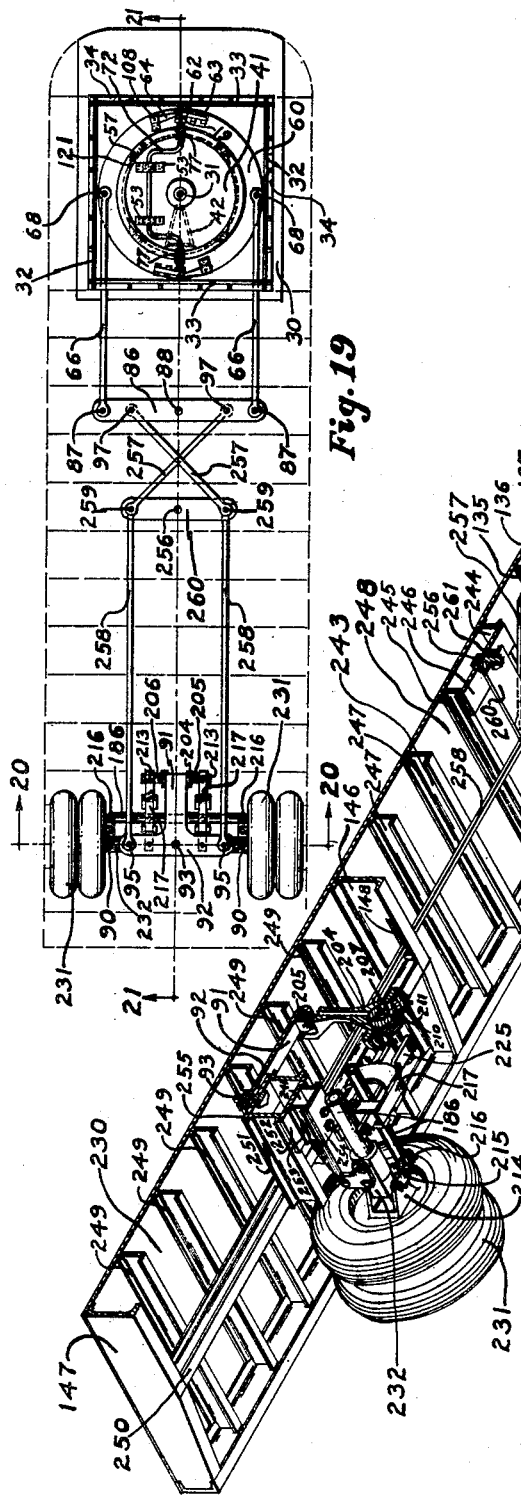

United States Patent Office 2,785,909
Patented Mar. 19, 1957

2,785,909

STEERING MECHANISM FOR VEHICLES

Ralph Barnard, New Orleans, La.

Application September 3, 1954, Serial No. 454,054

11 Claims. (Cl. 280—426)

This invention relates generally to the steering mechanism for vehicles, and more particularly to the steering mechanism for the tractor semi-trailer combinations.

The conventional practice for the manufacture of semi-trailers with tandem axles is to place two stiff axles as close together as possible in such a manner that the wheels slip sideways whenever the vehicle travels around a curve. This slippage increases as the wheels are spaced further apart.

The various highway departments and street departments object to concentrated loads caused by placing two axles close together, and the load limits in some States allow the gross load of the vehicle to be increased as the axles are spread apart and some States allow the gross load to be increased whenever a third axle is added to help support the rear end of the semi-trailer. It is very desirable to space the axles far apart so that the semi-trailer will be allowed a greater gross load on the public thoroughfares; but, the tandem wheels must be arranged so that the tires will not be ruined when traveling around curves and backing into loading docks.

Several types of semi-trailers have been designed and patented which use one stiff axle in tandem with one or more laterally movable axles which trail along with a colter type of steering. These axles have several disadvantages in practice but the principal disadvantage seems to be the difficulty when backing into loading docks.

In the type of steering mechanism which synchronizes the steering of the semi-trailer wheels with the radius of the curve on which the road tractor is traveling, the angle which the tractor can turn with relation to the semi-trailer is limited. In practice, the truck drivers back their vehicles into a loading dock and jackknife, or fold, the tractor around to the side of the semi-trailer to clear the roadway in front of the loading point. Sometimes, in crowded city streets, the truck driver wishes to turn a sharp corner and the semi-trailer steering exceeds the steering limit of the semi-trailer. So far as I am aware, in all the semi-trailers previously designed to synchronize the steering of the semi-trailer wheels with the turning of the road tractor, the turning of the road tractor is limited at some point because of interference with the steering mechanism.

The principal object of this invention is to place an automatic clutch in the semi-trailer steering mechanism so that the steering of the semi-trailer wheels is synchronized with the radius on which the road tractor is traveling until the radius of travel becomes so small that the semi-trailer wheels have reached their limit of steering. At this radius the clutch automatically disengages the steering mechanism from the tractor and locks the semi-trailer wheels at their maximum angle of steering. The tractor can continue turning on a shorter radius and the semi-trailer wheels are partially steered and partially dragged around the curve of shorter radius; but, no damage will be done to the steering mechanism. As the tractor straightens out and the radius increases, the steering mechanism is automatically unlocked from its fixed minimum radius and the clutch is automatically engaged so that the synchronized steering continues with no attention from the operator.

Another main object of this invention is to equip a tracking type of semi-trailer with the steering clutch described above.

Another object is to keep the mechanism as light in weight as possible.

Another object is to keep the lever arms of the steering mechanism as long as possible so that slack in the joints caused from wear will have the least possible effect on the steering, and so that the force required to move the levers will be smaller; therefore, the steering links may be made smaller and reduce the weight of the vehicle.

Another object is to have the steering arms which drop down from the bedframe lead the stub axles so that the dirigible wheels will be self-aligning with a colter type of action.

Another object is to attach the connecting rods on the tandem axles to the steering mechanism above the axles with knee action steering arms for better control of the dirigible wheels while the axles move up and down and oscillate.

The above outlined and further objects, advantages, and features of the invention will be more easily understood or will become apparent from the attached drawings and from the following description of two embodiments of the invention.

In the drawings,

Figure 1 is a side elevation of a tractor semi-trailer combination showing one embodiment of the invention.

Figure 2 is a top plan view of the vehicle shown in Fig. 1, showing the principal features of the steering mechanism which are attached to the underside of the deck, or bed.

Figure 3 is a top plan view of the steering mechanism shown diagrammatically.

Figure 4 is a perspective view in section on line 4—4 of Fig. 2 showing the complete assembly of the steering mechanism and equalizing mechanism for one half of the vehicle on one side of the center line.

Figure 5 is a perspective in section on line 5—5 of Fig. 2 showing the underframing in detail for the front part of Fig. 4 when the steering clutch housing is removed.

Figure 6 is a perspective of the steering clutch housing completely assembled and in section on line 5—5 of Fig. 2 so that part of the steering clutch mechanism on the center line of the semi-trailer is shown.

Figure 7 is a perspective in section on line 5—5 of Fig. 2 showing the underside of the cover for the steering clutch housing, Figure 8 is a perspective in section on line 5—5 of Fig. 2 looking into the top of the steering clutch housing with the cover removed and showing the assembly of the steering clutch mechanism.

Figure 9 is a vertical section across the semi-trailer on line 9—9 of Fig. 2 and line 9—9 on Fig. 3.

Figure 10 is a developed section of the cam shoulders on line 10—10 of Fig. 2.

Figure 11 is an exploded view in perspective and in section on line 5—5 of Fig. 2 showing all the parts in detail which make the assembly shown in Fig. 8.

Figure 12 is a vertical section across the semi-trailer on line 12—12 of Fig. 2 and line 12—12 of Fig. 3 showing a typical stub axle assembly.

Figure 13 is a vertical section on line 13—13 of Fig. 2 and line 13—13 of Fig. 3 showing the knee action steering mechanism on the center line of the vehicle.

Figure 14 is a vertical section on line 14—14 of Fig. 3 and line 14—14 of Fig. 13 showing the knee action steering mechanism across its front.

Figure 15 is a vertical section on line 15—15 of Fig. 12 showing the knee action steering mechanism in detail of the levers and pivots which are offset to opposite sides of center line.

Figure 16 is a plan view in section on line 16—16 of Fig. 1 showing the typical assembly of one of the tandem axles which has dirigible wheels mounted on opposite ends.

Figure 17 is a vertical section on line 17—17 of Fig. 2 and on the line 17—17 of Fig. 16 showing the gooseneck radius rod passing around the tie rods.

Figure 18 is a vertical section on line 18—18 of Fig. 1, on line 18—18 of Fig. 16 and on line 18—18 of Fig. 17 showing the depending bracket for one side of the vehicle.

Figure 19 is a diagrammatic plan view of a modified form of the invention, showing the modified steering mechanism for a tracking type of semi-trailer, with a phantom view of the deck, or bed, above.

Figure 20 is a vertical section across the vehicle on line 20—20 of Fig. 19.

Figure 21 is a perspective view in section on line 21—21 of Fig. 19 showing a section on center line and one side of the modified form completely assembled.

Referring to the drawings in detail, in Fig. 1 and Fig. 2 are shown a road tractor 22 with a conventional fifth wheel 23 mounted on the frame of the road tractor 22. A semi-trailer 24 is coupled to the road tractor 22 with the front end of the semi-trailer 24 supported by the fifth wheel 23 and the back end of the semi-trailer 24 in equalized suspension on wheels 25. There are six wheels 25 mounted on opposite ends of axles 26, 27, and 28. The axle 27 is the second axle from the back and is a stiff axle. The axles 26 and 28 are located in front of and in back of the axle 27 and have dirigible wheels mounted on stub axles on opposite ends of the axles 26 and 28 with the steering synchronized with the road tractor 22. The axle 28 is the back axle and the axle 26 is the third axle from the back of the semi-trailer.

The steering mechanism of the dirigible wheels on the axles 26 and 28 is coordinated with the stiff axle 27 so that the back end of the semi-trailer 24 will swing on the axle 27 as a pivot when turning into or out of curves. The axle 27 trails along behind the road tractor 22 with no steering mechanism so that the semi-trailer 24 will steer the same in traffic as though it were a short length semi-trailer with one stiff axle supporting the back end of the semi-trailer and located the same distance from the kingpin as the axle 27 of the semi-trailer 24.

The upper part of the semi-trailer can be any common type of semi-trailer with any conventional type of underframing. The steering mechanism described in this invention can be made to fit under the back part of any common type of semi-trailer. The transverse beams, and other types of framing, around a conventional kingpin can easily be changed to receive the steering clutch housing 29.

In order to reduce weight, the steering mechanism is fastened to the framing under the floor of the semi-trailer. In the accompanying drawings, the steering mechanism is shown mounted on a more or less conventional deck, or bed. Any type of equalizing mechanism can be used to equalize the load on the wheels 25; however, the equalizing mechanism illustrated in the accompanying drawings and described in this specification is the same type of equalizing mechanism described and illustrated in my previous application Serial No. 319,093, filed November 6, 1952, now Patent 2,704,215.

In Fig. 5 is shown the arrangement of the underframe structure so that the steering clutch housing 29 can be assembled thereunder.

It might be noted at this point, line 4—4 and line 5—5, and line 13—13 are all located on the center line of the semi-trailer. As the semi-trailer is symmetrical about center line, except for the locking crank 72 inside the steering clutch housing 29, a perspective on one side of the center line will also be a mirror view for the opposite side of the center line. By showing the perspectives as sections along the center line, I can bring out certain principal features which are located with their center lines on the center line of the vehicle, which would be very difficult to show otherwise. This note also applies to line 21—21 on Fig. 19.

The steering clutch housing 29 is shown in Fig. 6 completely assembled and cut in section along the longitudinal center so that the principal features can be seen. The steering clutch housing 29 is made in the shape of a box so that it can be bolted underneath the semi-trailer 24 completely assembled. The steering clutch housing 29, completely assembled as shown in Fig. 6, bolts up underneath the deck, or bed, 43 to complete the semi-trailer assembly 24 as shown in Fig. 4.

The entire steering clutch assembly is built up around the apron plate 30 as a base. A large circular hole is cut in the apron plate 30 concentric with the desired location of the kingpin, or coupling pin, 31, best seen in Fig. 11. Side walls 32 and end walls 33 are welded onto the apron plate 30 and a flange 34 with stiffeners 35 are welded around the outside of the side walls 32 and the end walls 33. The front end of the apron 30 is curved up to fit over the curved underframe members of the deck, or bed, 43, and holes 36 are punched, or drilled, near the four edges of the apron plate 30 so that they will match the holes in the underframing members 37, 38, and 39 in Fig. 5. The rough blank for a lower cam ring 40 is welded onto the apron plate 30 and the welded assembly is finished as described later.

A turntable plate 41 has a steering lug 42 welded underneath. The steering lug 42 can be any size or shape to fit between forks of the conventional fifth wheel 23.

A kingpin 31 fits into the round hole in the center of the turntable plate 41 in a manner which will be described later.

The steering clutch housing 29 has a cover 44 which holds the kingpin 31 in place and is integral with an upper cam ring 45. The cover 44 can be a casting, forging, or a built up welded assembly, but I prefer to use a forging. The unfinished blank for the cover 44 has the general shape in Fig. 7. Holes 46 are drilled, or punched, near the four edges of the cover 44 to match holes 47 in the flange 34. Referring to Fig. 8 and Fig. 11; at the corners where the end walls 33 butt side walls 32, the plates are butt welded and the corners are finished to a predetermined dimension, vertical and true. The top edges of the side walls 32 and end walls 33, and the tops of the stiffeners 35 are all surfaced off parallel to the bottom surface of the apron plate 30. This gives reference planes transverse, longitudinal, and horizontal; and all the bottom part of the steering clutch assembly is referenced to these finished surfaces.

Referring to Fig. 7, the bottom surface of the cover 44 is dressed off around the edges so that the finished surface is a perfect plane and lugs 48 located at each corner of the cover 44 have their outside faces finished to register with the inside faces of the side walls 32 and the end walls 33, so that the upper cam ring 45 and the hole for the kingpin 31, when finished with reference to these surfaces, will have a proper relation with all the bottom part of the steering clutch assembly.

The cover 44 holds the kingpin 31 in place and all the force of drawbar pull, brake thrust, and side thrust exerted on the kingpin 31 by the fifth wheel 23 must be transmitted as stresses in the cover 44 so as to exert the corresponding forces on the deck, or bed, 43 in addition to local stresses set up because these forces exerted by the kingpin 31 are below the resistance offered by the cover 44 and create a torque which combines with the aforesaid forces to create even greater stresses in the immediate vicinity of the kingpin 31. Because of these severe stresses, a large integral rib 49 runs across the cover from front to back. A large boss 50 in the center of the cover 44 has a hole bored through the center for a forced fit, or a snug fit, with the kingpin 31.

A turntable plate 41 has an integral built up ring 51 in the center on top and the steering lug 42 underneath as previously described. The bases 52 of bearings 53 are fastened to the top of the turntable plate 41 preferably by rivets with countersunk heads on the bottom finished off flush with the bottom of the turntable plate 41. A hole is bored through the center of the built up ring 51 for a running fit with the kingpin 31, and a rabbet, or groove, 54 is milled concentric with the hole through the ring 51 so that the bottom of a collar 55 on the kingpin 31 will fit flush with the bottom of the turntable plate 41. The outside perimeter of the turntable plate 41 is milled concentric with the hole which was bored in the ring 51, and a rabbet, or groove, is milled below the cam ring 40 so that the bottom of the turntable plate 41 will fit flush with the bottom of the apron plate 30.

The lower cam ring 40 and the upper cam ring 45 have the cam surfaces milled so that shoulders 57 and 58 will fit together as shown in the developed section in Fig. 10 when the cover 44 is bolted in place.

The outside perimeter of the flange 34 and the stiffeners 35 are finished for a snug fit inside the underframing members 37, 39, and 59 as shown in Fig. 5, and the outside perimeter of the cover 44 is also finished for a snug fit with the same underframing members; thusly, when the parts are bolted together and become the steering clutch housing 29, the steering clutch housing 29 will slip into place under the deck, or bed, 43 and the kingpin 31 will be properly located under the semi-trailer 24.

The outside perimeter of the lower cam ring 40 and the inside perimeter of a clutch ring 60 are finished to fit together with a running fit. The clutch ring 60 is really an annular plate which fits over the lower cam ring 40 and journals over the cam ring as a bearing, or guide. Anchor posts 61 are located diametrically opposite and are integral with the clutch ring 60. Locking levers 62, locking pins 63, and locking springs 64 are mounted on the clutch ring 60 as shown in Fig. 3 and Fig. 8. Holes 65 are drilled and countersunk diametrically opposite in the clutch ring 60. In making the assembly, it is convenient, but not necessary, to have the holes located so that a line passing through the center of the anchor posts 61 is perpendicular to a line passing through the centers of the holes 65. A pair of steering links 66, 66 with eyes 67 at each end are pivotally fastened to the clutch ring 60 by bolts 68 with countersink heads 69. The bolts 68 pass up through the holes 65 with the countersink heads 69 nesting in the countersunk holes 65. The washer 70 and the eye 67 of the steering link 66 are forced over the bolt 68 and they are secured by a nut 71.

Whenever the wheels 25 are being steered from the fifth wheel 23, a latching crank 72 latches the turntable plate 41 to the clutch ring 60 so that they revolve together. The latching crank 72 is made from a single rod with four radiused bends as shown in Fig. 11. A shaft 73 has two turned down, or machined, segments 74 which journal in the bearings 53 and anchor the latching crank 72 to the turntable plate 41 so that they revolve together at all times. Crank arms 75 are made as long as possible so that crankpins 76 of the latching crank 72 will move as little as possible in a horizontal direction whenever the crankpins 76 are forced to move up and down by rollers 77 striking the shoulders 57 and 58 on the surfaces of the cams 40 and 45. The turned down segments 74 have shoulders 78 finished at each end and which journal with the sides of the bearings 53 to act as thrust bearings and prevent the locking crank 72 from shifting endwise.

The rollers 77 slip over the crankpins 76 of the latching crank 72 and journal on the turned down segments 79 with shoulders 80 acting as inside thrust bearings. The outside end of the turned down segments 79 terminate with threaded portions 81. A latching bar 82 is made by turning down the projecting end of the crankpins 76 small enough that nut 83 can slip across the latching bar 82 and engage the threads 81. The nut 83, when run up on the threads 81, secures the roller 77 in place as shown on Fig. 8. The latching crank 72 is mounted on the turntable plate 41 so that the centers of the crankpins 76 align with the kingpin 31; therefore, the rollers 77 will oscillate about the kingpin 31 along the path of a circular curve. For this reason the rollers 77 are made conical and the surface of the cams 40 and 45 are made conical so that the rollers 77 can roll in a curved path over the cam surfaces without sliding action. The upper cam 45 is spaced far enough above the lower cam 40 that the rollers 77 can only contact one cam surface at the same time.

Each anchor post 61 has a tooth 84 located on each edge with a groove 85 between the teeth. When the cover 44 is bolted onto the steering clutch assembly, a cam surface 100 holds the rollers 77 down which forces the latching bar 82 down into the groove 85 between the teeth 84; therefore, any angular movement of the road tractor 22 with relation to the semi-trailer 24 will rotate the turntable plate 41 because the steering lug 42 wedged into the fork of the conventional fifth wheel 23 acts as a crank to rotate the turntable plate 41 in unison with the fifth wheel 23 about the kingpin 31, and the latching crank 72 mounted on the turntable plate 41 with the latching bars 82 pressed down between the teeth 84 of the anchor posts 61 which are integral with the clutch ring 60, will cause the clutch ring 60 to rotate the same angle about the kingpin 31 with respect to the semi-trailer 24 as the road tractor 22. The steering links 66 which are pivotally mounted on the clutch ring 60 by bolts 68 as previously explained, have the opposite ends pivoted to the lever bar 86 by bolts 87 as shown on Fig. 3 and Fig. 4. The lever bar 86 is pivotally attached to the underframing of the deck, or bed, 43 by bolt 88. By this hookup the lever bar 86 rotates exactly the same angle about the bolt 88 that the road tractor 22 rotates about the kingpin 31.

The steering mechanism for the dirigible wheels 25 on the axles 26 and 28 is the same except that the wheels 25 on the axle 26 are in front of the pivot axle 27 and turn the same direction that the road tractor turns; whereas, the wheels 25 on the axle 28 are behind the pivot axle 27 and turn the opposite direction from the road tractor 22; therefore, the explanation of the steering mechanism for either axle 26 or axle 28 which follows is applicable to both axles.

The steering of stub axles 89 about vertical pivot pins 90 is accomplished by means of mechanism attached to a leg 91 of a T-shaped lever 92. As will be explained later, each wheel 25 turns the same direction and the same angle about its vertical pivot pins 90 as the leg 91 above that wheel turns about its pivot point 93. The arms on the T-shaped lever 92 are connected by cross links 94 which are attached at pivot points 95. As the T-shaped levers 92 for both axles are the same, the pivot points 95 will be located the same distance apart for both axles; therefore, the wheels on the axles 26 and 28 will steer the same amount but in opposite directions.

The T-shaped lever 92 above the axle 26 and the lever bar 86 are connected by drag links 96. The drag links 96 are fastened above the arms of the T-shaped lever 92 at pivot points 95 and are fastened below the lever bar 86 at pivot points 97.

When the vehicle with a plurality of wheels is traveling on a curve, the axles of all the wheels must point to a common point which is the axis of all the concentric curves on which the wheels are traveling. Any wheels which fail to conform to this rule will be dragged sideways enough to conform to the curve on which the remainder of the wheels are traveling. The driving wheels of the road tractor 22 in Fig. 2 are non-dirigible wheels mounted on parallel axles; so, these wheels will drag sideways on a curve enough to conform to a curve located on a transverse line located half way between the driving wheels. A point 98 out in space where this transverse line midway between the driving wheels of the road tractor 22 intersects a line through the center of axle 27 is the axis of the curve on which the wheels are traveling; therefore, the dirigible wheels 25 on the axles 26 and 28 must pivot on the vertical pivot pins 90 so that the stub axles 89 on the inside of the curve point toward the point 98 at all times, and the stub axles 89 on the outside of the curve point away from the point 98 out in space at all times. This is a mathematical problem of ratio and proportion which can easily be solved for any given vehicle, but the result of any solution is that the angle which the dirigible wheels 25 revolve about the vertical pivot pins 90 is proportional to the angle which the road tractor 22 revolves about the kingpin 31 when the vehicle travels from a straight path into a curved path; but, the angle which the dirigible wheels 25 revolve is much less than the angle which the road tractor revolves. The pivot points 95 are set at a fixed distance apart and the pivot points 97 at the opposite ends of the drag links 96 are spaced closer together; therefore, a large angular movement of the lever bar 86 about the bolt 88 will produce a smaller, but proportional, angular movement on the arms of the T-shaped lever 92 about the pivot point 93.

The ratio between the angle which the fifth wheel 23 revolves and the angle which the dirigible wheels 25 revolve depends on the length of the semi-trailer 24 and the spacing of the axles 26, 27, and 28, and the type of road tractor used has no effect on the steering of the dirigible wheels 25 on the axles 26 and 28; therefore, the pivot points 97 can be located at a fixed distance from the center of the bolt 88, which fixed distance is constant for all semi-trailers of the same size and the same axle spacing.

The angle which the dirigible wheels 25 on the axles 26 and 28 can revolve about their vertical pivot pins 90 is limited by elliptical springs 99 which are mounted on opposite ends of each axle near the wheels 25 and by the radius rods located below the springs. The clearance shown on Fig. 16 is typical for all the springs and radius rods. The dirigible wheels 25 can revolve approximately 15 degrees each way from normal, which gives a turning radius of about 20 feet when the wheels are spaced as shown in Fig. 1. If the semi-trailer is about 35 feet long, the road tractor 22 will be revolved at an angle of 40 to 45 degrees with respect to the semi-trailer whenever the wheels reach their steering limits, and this is the angle which the shoulders 57 and 58 on the cams 40 and 45 must be located each way from center line of the semi-trailer 24.

For convenience, the crankpins 76 are made to coincide with the center line of the semi-trailer 24 when the vehicle is traveling on a straight line; so that the steering mechanism in the steering clutch housing 29 can be made symmetrical about the center line.

In the ordinary course of travel, the crankpins 76 oscillate back and forth on opposite sides of the center line with the cam surface 100 holding the rolls 77 down so that the latching bars 82 are pressed down into the grooves 85 between the teeth 84. With the steering mechanism latched together thusly, the wheels 25 on the stiff axle 27 trail along like a short length semi-trailer with only one axle, and the dirigible wheels on the axles 26 and 28 steer in proportion to the sharpness of the turn which the road tractor 22 makes, until the road tractor 22 makes a turn so sharp that the dirigible wheels 25 reach their steering limit. Here the rollers 77 reach the end of the cam surface 100 and strike the shoulders 57 on the lower cam ring 40 which throws the latching bars 82 vertically until the latching bars 82 are above the teeth 84. At the same time that the latching bar 82 is thrown vertically as described above, the pressure on a lever arm 102 is released so that the locking levers 62 can rotate on a bolt 103 as a fulcrum and plunge the locking pins 63 into holes 104 which were drilled in the apron plate 30; thusly, locking the clutch ring 60 against further rotation with respect to the semi-trailer 24 which, in turn, locks the dirigible wheels 25 at their steering limit.

When the dirigible wheels 25 on the axles 26 and 28 reach their steering limit, the steering mechanism is automatically disconnected simultaneously with the locking action of the locking mechanism which locks the wheels at their steering limit. As the road tractor 22 travels into a sharp turn, the turntable plate 41 continues to revolve with the road tractor 22. The latching crank 72 is anchored to the turntable plate 41 by the bearings 53 and must continue to revolve with respect to the semi-trailer 24 the same as the road tractor 22. Whenever the rollers 77 strike the shoulders 57 as previously described, the rollers 77 are lifted vertically with respect to the clutch ring 60 as they roll up the incline and over the shoulders 57. As the road tractor 22 continues to revovle with respect to the semi-trailer 24, the rollers 77 are held at their elevated position by a cam surface 101 on top of the lower cam ring 40. In this elevated position, the rollers 77 lift the latching bars 82 high enough to pass over, or above, the locking levers 62, and the pivot bolts 68 and the steering links 66 and spring holders 108; so that the rollers 77 and the latching bars 82 oscillate back and forth in an elevated position up against the bottom side of the cover 44 in the recess on either side of the large integral rib 49. The rollers 77 continue to oscillate back and forth above the cam surface 101, holding the latching bars 82 at the aforesaid elevated position until the road tractor 22 straightens out enough for the crankpins 76 to oscillate back toward the center line of the semi-trailer 24 enough for the rollers 77 to strike the shoulders 58 on the upper cam ring 45 which throws the latching bars 82 downward between the teeth 84 into the grooves 85 and simultaneously pressing down the lever arm 102 which lifts the locking pins 63 so that the clutch ring 60 is free to revolve again.

The locking levers 62 and associated parts which make up the locking assembly are made low and flat so that the latching bar 82 can pass over, or above, as previously explained. The locking pins 63 are pivotally secured to the end of the locking levers 62 by passing a bolt 115 through the integral eye of the locking pins 63 and the hole in the end of the locking levers 62 and securing the bolt 115 in place with a nut 105. Standards 106 are located diametrically opposite on the clutch ring 60 and are secured thereto by welding or some such means. Holes 107 diametrically opposite and in spaced relation with the standards 106, are drilled in the clutch ring 60. Aligned holes are drilled through the top end of the standards 106 as shown in Fig. 11. Referring to Fig. 3, the diametrically opposed locking springs 64 are located on the opposite side of the center line from each locking lever 62. Diametrically opposite spring holders 108 are secured to the clutch ring 60 by some such means as cap screws 109. The spring holder 108 has a notch 110 cut in the outer edge for a press fit with the butt end of the locking spring 64. The butt end of the locking spring 64 is pressed into the notch 110 until a hole 111 aligns with a hole 112 and then an additional cap screw 113 is inserted in the hole and secured in a tapped hole below to act as a centering pin for the locking spring 64. The locking spring 64 has the butt end mounted horizontally in the notch 110, and an end 114 curves up as shown on Fig. 11 so that considerable pressure will be exerted whenever the end 114 is pressed down against the clutch ring 60 as shown in Fig. 8. To complete the assembly, the points of the locking pins 63 are inserted in the holes 107 and the lever arm 102 is pressed down over the end 114 of the locking spring 64 until the hole in the center of the locking lever 62 aligns with the holes through the tops of the standards 106, and the bolt 103 is inserted through the holes and secured by having a tapped hole in one of the standards 106 or by a conventional nut, so that the bolt 103 acts as a fulcrum on which the locking lever 62 pivots.

The latching crank 72 is secured to the turntable plate 41 by laying the two turned down, or machined, segments 74 on the bearing base 52. Bearing caps 116 are fastened in place with machine screws, or bolts 117 which assembly is designated as the bearing 53. The shaft 73 of the latching crank 72 journals in the bearings 53 as the latching bar 82 moves up and down when actuated by the rollers 77 striking the shoulders 57 and 58. Of course, the latching bar 82 moves up and down on the arc of a circle, but the arc of the circle is so small that the horizontal movement is almost zero; therefore, for practical purposes, the latching bar 82 may be considered as moving vertically.

When the rollers 77 are pressed down by the cam surfaces 100 of the upper cam ring 45, the latching bars 82 press down the lever arms 102 which in turn press down the ends 114 of the locking springs 64. When the lever arms 102 are pressed down, each locking lever 62 pivots on the bolt 103 as a fulcrum and the locking pins 63 are lifted up until the tips are flush with the bottom of the clutch ring 60. The locking mechanism is held in this position so that the clutch ring 60 can revolve, or oscillate, about the outside of the lower cam ring 40. When the rollers 77 strike the shoulders 57, the latching bars 82 are lifted vertically and the pressure is released on the locking springs 64, and the steering clutch is simultaneously disconnected. The springs 64 being under pressure with the ends 114 pushing up under the lever arms 102 will cause the locking levers 62 to pivot about the bolts 103 as fulcrums and force the locking pins 63 into the holes 104 whenever the latching bars 82 are lifted vertically and the pressure is released from the lever arms 102.

The holes 104 are located so that they will be directly under the locking pins 63 at the center of the throw whenever the rollers 77 strike the shoulders 57. The locking pins 63 have tapered points and the inside corners of the teeth 84 are radiused so that a slight misalignment of the parts when the rollers 77 strike the shoulders 57 will not cause the locking mechanism to jam. The mechanism is arranged so that the locking pins 63 have partially entered the holes 104 before the latching bars 82 have completely cleared the tops of the teeth 84. This is to prevent vibrations, or rough roads, from throwing the locking pins 63 out of line with the holes 104 before the pins enter the holes. Whenever the rollers 77 swing back and strike the shoulders 58, the rollers 77 roll back under the cam surface 100; the locking process is reversed, and the locking springs 64 are under compression again.

Cam surfaces 118 on the lower cam ring 40 serve no useful purpose, but it is desirable to have the cam ring 40 as thick as possible across the center line of the vehicle to reinforce the apron plate 30 and it is convenient to use the same milling cutter all the way around the cam ring. Cam surfaces 119 on the upper cam ring 45 are almost flush with the bottom surface of the cover 44 and only serve to keep the rollers 77 from bouncing up and down.

It might be noted at this point, that either the upper cam ring or the lower cam ring could be dispensed with entirely by having springs to force the rollers 77 against the remaining single cam ring.

As the bolts 68 oscillate about the kingpin 31 and the bolts 87 oscillate simultaneously about the bolt 88, the steering links 66 move longitudinally as intended; but, the pivot points at the bolts 68 and 87 move on the arc of a circle which induces a lateral motion to the steering links 66 as shown at 120 on Fig. 3. This lateral motion is limited by the locking mechanism which locks the clutch ring 60 in place whenever the roller 77 strikes the shoulder 57; so, a notch 121 in the side of the lower cam ring 40 only needs to be deep enough to take care of the movement within these limits. When the steering links 66 pass through the end wall 33 at the back end of the steering clutch housing 29, a slot 122 is also provided for the above described transverse movement. The slot 122 is placed directly below the flange 34 and the stiffeners 35 are located to clear the ends of the slots 122. The slots 122 can best be seen on Fig. 6 where the flange 34 is cut away to show the slot. Notches 123 are cut in the end walls 33 and finished to fit snug around the ends of the large integral rib 49 of the cover 44.

The large boss 50 in the center of the cover 44 has a face finished on the bottom which serves as a thrust bearing with the integral built up ring 51 on the turntable plate 41. The kingpin 31 passing through the hole as previously explained, keeps the two surfaces in alignment so that practically all the load of the semi-trailer 24 which is carried by the fifth wheel 23 is transferred through the large integral rib 49. The kingpin 31 is held in place by a large flat nut 124 which turns onto threads 125 until it is chock against a shoulder 126. The top of the steering clutch assembly 29 is so close to the bottom of the floor of the semi-trailer 24 that the top of the cover 44 is recessed around the hole which was bored for the kingpin 31 so that the large flat nut 124 only protrudes a small distance above the top of the cover 44 as best seen in Fig. 9.

The cover 44 is securely bolted in place by rows of bolts 127 on four sides of the steering clutch housing 29. The bolts 127 are inserted in all the holes 46 in the cover 44 and the corresponding holes 47 in the flange 34 and securely tightened.

The steering clutch housing 29 as shown in Fig. 6, is fitted into the recess between the underframing members 37, 39, and 59 and securely bolted to the underframing members with countersink head bolts in the countersunk holes 36 as shown in Fig. 4 and Fig. 9.

The automatic steering clutch is in effect a positive locking clutch consisting of a driving member, which is the turntable plate 41, a driven member, which is the clutch ring 60, and the driven member 60 is positively locked to the driving member 41 by the movement of the latching crank 72 as previously described. The latching crank 72 is actuated, or controlled, by the cam surfaces and shoulders on the cam rings 40 and 45; therefore, the automatic steering clutch encased in the steering clutch housing 29 is a cam operated, positive locking clutch designed for oscillating type of motion where it is desired to have the oscillating motion of the driven member sharply stopped at a predetermined angle without interfering with the oscillating motion of the driving member.

The steering mechanism is suspended from the underframing of the semi-trailer 24, and is entwined among the structural members of the underframing and among the equalizing mechanism in such a manner that it is deemed advisable to describe the underframing and the equalizing mechanism along with the detail description of the steering mechanism. The semi-trailer 24 illustrated in the accompanying drawings is one version of a common type of semi-trailer 24 illustrated in the accompanying drawings is one version of a common type of semi-trailer with the underframing modified sufficiently for attaching the steering mechanism and one additional axle; and is more or less typical for modifying all common types of semi-trailers for use with this invention.

The deck, or bed, 43 is made from two large structural members 128 on each side and opposite hand to each other, reduced in depth at a transverse member 129 and the front ends of the large structural members 128 are radiused to frame into the transverse member 59. The bottom flanges are curved up over the wheels 25 at concave recesses 131, so that the wheels 25 cannot drag on the underframing whenever the wheels move up and down and oscillate in equalized suspension. The two large structural members 128 are connected by transverse members to be described later and this underframe assembly is covered by a large steel plate 130. In modern semi-trailer construction, a large steel plate welded over the underframing serves as reinforcing for the top flanges of the structural members so that the structural members can be made smaller and lighter, and diagonal bracing can be eliminated; thereby, greatly reducing the dead weight of the semi-trailer. As seen in Fig. 5, the longitudinal members 39 frame into the transverse members 37 and 59 to form a square, or rectangular, recess for receiving the steering clutch housing 29 as previously described. The front piece 38 is narrow in section and has radiused ends which bow back to frame into the front side of the transverse member 59. The radiused ends of the large structural member 128 are framed into the back side of the transverse member 59 so that the rim under the radiused corners of the deck 43 is continuous. A short structural tie 132 is radiused to fit flush with the bottom flange of the transverse member 59 and with the bottom flange of the front piece 38, and the flange of the tie 132 is perforated to align with the holes in the longitudinal members 39. The transverse members 37 and 129 have slots cut through the webs as shown in Fig. 5, which align with the slot 122 in the end wall 33. The transverse member 133, as seen in Fig. 4, also has slots in the web to align with the slots in the transverse members 37 and 129 and with slots 122 in the end wall 33.

Transverse members 134 and 135 are narrow in section so that the steering mechanism suspended from a batten plate 136 can oscillate without interference. The steering links 66 are pivotally secured above the lever bar 86 by the bolts 87, and the lever bar 86 pivots on the bolt 88 and is spaced from the batten plate 136 by a washer 137.

The steering clutch housing 29, as assembled in Fig. 6, is suspended under the deck, or bed, 43 by inserting the eyes 67 of the steering links 66 into the slots in the transverse member 37 and then threading the steering links 66 through the slots in the transverse members 129 and 133 until the cover 44 impinges against the transverse member 37. The steering clutch housing 29 is then pressed into place and securely bolted as previously described. The bolts 87 are then inserted in the holes so that the steering links 66 are pivotally secured above the ends of the lever bar 86. The drag links 96 are bolted underneath the lever bar 86 at pivot points 97. A transverse member 138 is wider than the members 134 and 135 but narrow enough that the bottom flange of the transverse member 138 will clear the top of the drag links 96.

A pair of transverse members 139 and 140 are placed above each axle 26, 27, and 28. The transverse members 139 and 140 are in spaced relation with and symmetrical about the center line of the axles below. On either side of the axle 27, and spaced midway between the axle 27 and the adjacent axles, is another pair of transverse members 141 and 142 in spaced relation with and symmetrical about the line which is midway between the axles. In front of the axle 26 is located a transverse member 143 and in back of the axle 28 is located a transverse member 144.

The transverse members 139, 140, 141, 142, 143 and 144 are all the same depth, and are sized to frame across the top of longitudinal sill members 145, which are in spaced relation with the center line of the semi-trailer 24. The opposite ends of the longitudinal sill members 145 butt against a large transverse member 146 located in front of the equalizing mechanism, and a large transverse member 147 located at the back end of the semi-trailer. The bottom flanges of the longitudinal sill members 145 are flush with the bottom flanges of the large transverse members 146 and 147 for additional strength and for appearance. The large transverse members 146 and 147 have beveled ends so that the bottom flanges slope up to fit flush with the bottom flanges of the large structural members 128. The large transverse members 146 and 147 are the same except that the member 146 has slots 148 cut in the web to allow for lateral movement of the drag links 96. The members numbered 139 through 147 are all secured together by welding or some such means, and form a mat, or network, so that when one member is overstressed, the excess load will be transferred to adjacent members.

Over each axle, a pair of cross beams 149 and 150 in spaced relation with the axle below, having their bottom flanges flush with the bottom flanges of the longitudinal sill members 145, are butt welded to the members 145. On the center line of the semi-trailer 24, a batten plate 151 is welded over the top of each pair of cross beams 149 and 150 for the axles 26 and 28 only. It should be noted in Fig. 12, that a rectangular opening is left between the transverse member 139 and the cross beam 149 for the steering mechanism to pass through the underframing. The steering mechanism for axles 26 and 28 is mounted on the batten plates 151 as will be explained later. Horizontal plates 152 are welded under the cross beams 149 and 150 at each end of the cross beams to serve as bearing seats for bearings 153. The outside edges 154 of the horizontal plates 152 are welded under the bottom flanges of the longitudinal sill members 145 as shown in Fig. 12 so that the underframing can act as stiffeners for the horizontal plates 152, and the plates 152 can act as reinforcing for the underframing. The bearings 153 are bolted to the horizontal plates 152 with the cross arms of a T-guide structure 155 journaled in the bearings 153. Collars 156 secured to the cross arms of the T-guide structure 155 by bolts, or screws, 157 act as thrust bearings against the sides of the bearings 153 and hold the leg of the T-guide structure 155 on the center line of the semi-trailer 24 at all times and under all conditions of travel. The T-guide structure 155 is made from two pieces of tubing, or pipe, welded together so that the cross arms can act as shafting in the bearings 153 and the depending legs can act as cylindrical slides.

The axles 26, 27 and 28 are made from tubing. A heavy ring 159 is pressed to the center of each axle. The axles 26 and 28 must be finished on the ends for mounting the stub axles 89; therefore, long heavy rings 160 are pressed over the ends of the axles with the ends of the heavy rings 160 stopped flush with the ends of the axles 26 and 28. The axle 27 is a stiff axle with no steering mechanism; so, short heavy rings 161 are pressed over the ends of the axle 27 for mounting the equalizing mechanism. The ends of the aforesaid rings are then welded, or brazed, to the outside surfaces of the tubing so that they will be permanently secured and united. The heavy rings 159, 160, and 161 on the axles 26, 27, and 28 are then finished off symmetrical for the entire length of the axles to a predetermined thickness, forming facets on the front and back sides of all the heavy rings on the axles to be used as explained later. The heavy rings 160 on the axles 26 and 28 are faced off top and bottom near the ends to form flat surfaces perpendicular to the facets, for mounting the stub axles 89.

In the center of the facets on the heavy rings 159, holes are drilled in the exact center of the axles 26, 27 and 28 perpendicular to the surfaces of the facets. These holes are reamed for a press fit with the short heavy pins 162. The short heavy pins 162 are pressed into the holes so that they can be used as tooling pins for completing the axles and then serve as shafts to journal in slots 163 on the legs of a double-barrel guide 164.

The elliptical springs 99 are moved in toward the center line of the semi-trailer 24 enough that the dirigible wheels 25 on the axles 26 and 28 can rotate approximately fifteen degrees about the vertical pivot pins 90 in either direction from their normal. Large bolts 165 which pivotally secure the springs 99 to the axles 26, 27, and 28 are located directly below the centers of the springs 99. Equally spaced from the short heavy pin 162, holes are drilled and reamed perpendicular to the facets of the heavy rings 160 and 161 for a press fit with the large bolts 165. In the axles 26 and 28, vertical holes are drilled and reamed near the ends of the axles for a press fit with the vertical pivot pins 90.

The double barrel guide 164 is a housing like connection which permits the axles to reciprocate vertically, and to oscillate simultaneously about the short heavy pin 162 as a pivot, such simultaneous movements being permitted within the limits of the equalizing mechanism, and the double barrel guide 164 holding the short heavy pin 162 on the exact center line of the vehicle at all times.

The double barrel guide 164 consists of two vertical sleeves 166 connected by two integral cross members 167 and 168. The top cross member 167 serves as a tie rod to hold the two vertical sleeves parallel to each other at all times and to prevent the double barrel guide 164 from twisting apart at the narrow neck in the bottom cross member 168. Two large ribs which are used as bosses, are formed inside the vertical sleeves 166 below and above the bottom cross member 168. The large ribs below the bottom cross member 168 are milled off to fit over the facets on the heavy ring 159 with a running fit, and slots 163 are milled in opposite faces of the ribs so that the vertical sleeves 166 can drop down straddling the heavy ring 159 with the ends of the short heavy pin 162 journaled in the top of the slots 163 like a shaft and bearing. The short heavy pin 162 is secured in the slots 163 with a rectangular block which slides into the slot 163, having one concave edge which journals under the bottom of the short heavy pin 162 like a bearing cap and which is secured in the slot 163 by bolts, rivets, or dowels 169, as shown in Fig. 13.

The elliptical springs 99 are mounted on gimbal type spring mountings 170, and the elliptical springs 99 are held in a vertically disposed position at all times by links, or arms, 171 and 172. The links 171 have eyes at both ends and the links 172 have eyes at one end and a perforated fork at the other end. When the eye on one end of the link 171 is inserted in the perforated fork of link 172, the two links may be pivotally secured together by a pin 173.

The large ribs on the inside of the vertical sleeves 166 are milled off above the bottom cross member 168 so that the perforated fork of the link 172, when pivotally secured to the eye of the link 171, can fit between the vertical sleeves 166 with a running fit. Slots are milled perpendicular to the finished faces so that the pin 173 can journal in the bottom of the slots as a bearing. A bearing cap for the pin 173 is formed when rectangular blocks having one edge finished concave are slid into the notches above the pin 173 to journal above the pin 173, and secured by rivets, bolts, or dowel pins 174. The eyes on the outer ends of the links 171 and 172 are fastened in the clevis like ears on the inside of the gimbal type spring mountings 170 by bolts 175.

The semi-elliptical springs 99 are secured in special clamps 176 whenever a cover is bolted down over a centering pin as shown in Fig. 12. Integral trunnions 177, formed on the sides of the clamp 176, are journaled in the ends of a saddle 178. Note that the convex surface on the bottom of the clamp 176 is concentric with the trunnions 177 and journals in a concentric groove in a seat 179 of the saddle 178, so that the greatest part of the load on the semi-elliptical springs 99 rests directly on the seat 179 of the saddle. Skirts for the saddle 178 are represented by depending plates on each side of the seat 179. The depending plates, or skirts, fit snug over the facets of the heavy rings 160 and 161. Holes near the bottom of the depending plates, or skirts, journal on the large bolts 165. By this method of mounting, the elliptical springs 99 can oscillate laterally on the large bolts 165, and can rock longitudinally on the trunnions 177. This produces a double swivel, or more specifically, a gimbal type mounting.

The elliptical springs 99 are prevented from rocking sideways with respect to the underframing of the semi-trailer 24 by the links 171 and 172 fastened in the clevis like ears on the ends of the saddles 178. These clevis like ears are formed by a pair of plates projecting from the end of the saddle 178, the plates being located on opposite sides of the trunnion 177, with bolt holes for the bolts 175 as shown on Fig. 12.

As the vertical sleeves 166 slide up and down on the legs of the T-guide structure 155, the axles 26, 27, and 28 can oscillate on the short heavy pin 162 in combination with the vertical movement. The pin 173 is always located on the exact center line of the semi-trailer 24 the same as the short heavy pin 162. With the two pins at a fixed distance apart and pivotally connected to the saddles 178 at two points which are spaced the same distance apart as the aforesaid pins, the elliptical springs 99 will be held in a vertically disposed position. The elliptical springs 99 rock longitudinally on the trunnions 177 to act as equalizing levers across the axles. Depending brackets 180 located on both sides of the axle 27, and located midway between the axle 27 and the adjacent axles, have rollers 181 mounted at the bottom of the brackets 180. The rollers 181 are suspended in the loops formed at the bottom of flexible tension members 182. The outer ends of the elliptical springs 99 are shackled to the underframing of the deck 43 by roller type shackles which I call traveling shackles 183.

The axles 26 and 27 are held in spaced relation with the depending brackets 180 by radius rods 184. For axles 26 and 27, the rollers 181 and two clevises are mounted on a large shaft bolt 185 between the bottom legs of each depending bracket 180. The radius rods 184 are fastened to the clevises with vertical bolts which gives a double swivel connection between the depending brackets 180 and the radius rods 184. Since the saddle 178 remains vertically disposed at all times, there is no need to provide for twist, or rotary motion; so, the ends of the radius rods 184 are fastened to depending ears on the sides of the saddles 178 with a double swivel type of connection which pivots on a vertical bolt and pivots on a horizontal bolt. For axle 26, the radius rods 184 are fastened behind the axles and a tie rod 186 is transversely disposed in front of the axle so that there will not be any interference.

The axle 28 is held in spaced relation with the depending brackets 180 by a gooseneck radius rod 187. The tie rod 186 is transverse in front of the axle 28 where the ordinary radius rods should have been fastened; so, a radius rod was fastened to the clevis 188 with a vertical bolt 189 and dropped down to pass underneath the tie rod 186 and the axle 28. Behind the axle 28, a return bend 190 brings the radius rod 187 back up to the level of the axle 28 where it can be fastened with the same type of double swivel connection used for the axles 26 and 27. On Fig. 16 and Fig. 17 the gooseneck radius rod 187 is special for axle 28 and the remainder of the mechanism is typical for axles 26 and 28.

Fig. 18 is a typical illustration of a depending bracket 180. The roller 181 is spaced laterally so that the flexible tension member 182 will be near the outside edge of the roller 181 as shown in Fig. 16 and Fig. 18 when the axles are parallel to the deck, or bed, 43. The rollers 181 are wide enough that they will still be supported by the flexible tension members 182 when the axles oscillate about the short heavy pin 162 causing the springs 99 to move toward the center of the vehicle. A pair of clevises are rotatably mounted on the large shaft bolt 185 in addition to the roller 181, and vertical legs 191 are spaced laterally in opposite sides of the clevises. The bracket shown in Fig. 18 has only one clevis 188, so a washer 192 is substituted for the second clevis so that all the depending brackets 180 can be made the same width and with the same spacing relative to the center line of the semi-trailer 24. The transverse members 141 and 142 are spaced on opposite sides of the vertical legs 191 and welded thereto. Cover plates 193 are welded to both edges, or flanges of the vertical legs 191. The cover plates 193 start just above the rollers 181, and the tops of the cover plates 193 are welded to the bottom flanges of the transverse members 141 and 142. A notch 194 is cut in the top of the cover plates 193 so that they can be pushed up around the longitudinal sill members 145 and welded. The vertical legs 191 are preferably made from structural channels with reinforcing bars 195 shaped to fit in the trough of the channel at the bottom end to reinforce the structural channels below the cover plates 193 and to give a greater bearing area for the ends of the large shaft bolt 185.

The depending brackets 180, as described in the preceding paragraph, are made in the form of a hollow box girder which is very strong but very light in weight. Additional knee braces can be added at the top if needed.

The flexible tension members 182 illustrated in the drawings are listed in the various trade catalogues as "cable chain." I prefer to use cable chain because it will roll around a very small roller but is stiff enough laterally that it will not kink up when the vehicle is traveling over rough roads. A flexible tension member made from cable chain presents a flat surface to the flat surface of the roller 181, and the cable chain can shift sideways on the roller 181 whenever the springs 99 shift sideways, thereby keeping the vertical pull from the depending brackets 180 directly under the elliptical springs 99 at all times. Whenever the T-guide structure 155 is used with the double barrel guide 164 to keep the center of the axles exactly under the center of the vehicle at all times, it is necessary to make some provision for the vertical forces of the equalizing mechanism to shift sideways while supporting the vehicle without exerting a side thrust on the springs, such as providing the traveling shackles 183 and the cable chain for the flexible tension members 182; and, it is very desirable to keep the center of the axles exactly under the center of the vehicle at all times when the axles carry dirigible wheels steered by steering mechanism suspended from the underframe of the bed, or deck, above. In short, the equalizing mechanism described in this specification is necessary for combining with the steering mechanism to cause the steering mechanism to function properly. Although there are other types of equalizing mechanism which will combine satisfactorily with the steering mechanism described in this specification, the equalizing mechanism descrbed in this specification functions satisfactorily with the steering mechanism herein.

The outer ends of the elliptical springs 99 are fastened to the underframing of the semi-trailer 24 through the traveling shackles 183. Two shackle lengths 196 are bolted to the eye of the spring 99 and fastened to the ends of a base block 197 above by a pin, or rivet. Side plates 199 are fastened to both sides of the base block 197 which forms a small carriage frame. Rollers 200 are bolted between the side plates 199 at both ends of the carriage. The rollers have conical treads and flanges so as to roll under a track 201. The conical treads on the rollers are self-aligning the same as conical treads on overhead cranes or railway trucks. The track 201 is made by welding a channel transversely underneath the longitudinal sill members 145 with the flanges turned down so that the toes of the flanges will serve as rails for the rollers 200. A safety block 202 is secured above the track 201 as shown in Fig. 4 to prevent the carriage from bouncing off and becoming derailed when the semi-trailer 24 travels over rough roads.

The elliptical springs 99 do not twist, or rotate, with respect to the underframing of the semi-trailer 24; therefore, no provision is made for double swivel connections at the ends of the springs. The springs 99 are shackled to the ends of the cable chains 182 by means of a pair of shackle lengths which bolt to the end of the cable chain below the eye of the spring 99.

In the steering mechanism, the T-shaped levers 92 are bolted to the batten plates 151 at the pivot points 93. A washer 203 on top of the batten plate 151 spaces the T-shaped lever 92 vertically. The top of a vertical steering arm 204 is hinged to the front of the leg 91 of the T-shaped lever 92 by a bolt 205 and the bottom of the vertical steering arm 204 is fastened to the center of a cross arm 206 by a ball and socket connection. The cross arm 206 is made from a piece of tubing, or pipe. A ball 207 made of brass, or some such bearing material, is pressed to the center of the cross arm 206 and secured by several machine screws 208 which are screwed into tapped holes in the wall of the tubing. The top half of the socket which fits over the ball 207 is machined in the bottom of the steering arm 204 and an integral flange 209 is faced off on the bottom and holes drilled to match the holes in the bottom half of a socket 210. The bottom half of the socket 210 has an integral flange 211 faced off and bolted to the flange 209 with bolts 212. Holes are drilled in the cross bar 206 symmetrical from the ball 207 for pivotally connecting the steering mechanism with bolts 213.

The wheels 25 may be any conventional type of wheels; however, in the accompanying drawings I have shown the most common type of wheels in every day use, that is, dual wheels with pneumatic tires, attached to brake drums which turn with the wheels, and revolve on roller bearings or ball bearings, and mounted on a spindle which is fixed so that it cannot turn, and a backup plate for the brakes mounted on the spindle. The axle 27 is a stiff axle and the spindle may be attached to the axle in any conventional manner. The spindles for the axles 26 and 28 are the turned down, or machined, ends of the stub axles 89. The accompanying drawings show a stub axle 89 with an enlarged portion back of the wheels. A spindle projects outward from the enlarged portion with a nut on the end of the spindle for securing the bearings. On the back side of the enlarged portion is a clevis, or fork, 214. The clevis, or fork, 214 fits over the axles 26 and 28 as shown in Fig. 12 and pivots on the vertical pivot pin 90 as previously described. A steering arm 215 is attached to the bottom part of the clevis 214, and the front of the steering arm 215 is offset as shown in Fig. 4 so that the center line of the tie rods 186 will be the same elevation as the center line of the axles 26 and 28. The tie rod 186 had to be curved around the double barrel guide 164 because of interference between the two parts. Each end of the tie rods 186 are pivotally mounted on the steering arms 215 by bolts 216.

Referring to Fig. 15 and Fig. 16, the steering of the dirigible wheels 25 is controlled by a pair of stub tongues 217 which pivot on bolts 218 as a fulcrum. The ends of the stub tongues 217 are pivotally secured to the ends of the cross arm 206 by bolts 213. Holes for bolts 218 are drilled vertically through the axles 26 and 28 in perfect alignment with the holes which were drilled and reamed for the vertical pivot pins 90; therefore, the center line of the axles 26 and 28 is determined by a line passing through the centers of the vertical pivot pins 90 and the bolts 218. The holes for the bolts 216 are drilled in the steering arm 215 so that lines passing through the centers of the vertical pivot pins 90 and the bolts 216 will be perpendicular to the center line of the axle. When the holes for bolts 219 and bolts 213 are located on lines perpendicular to the center lines of the axles 26 and 28 at the bolts 218, and the holes for the bolts 219 are aligned with the holes for the bolts 216, the center lines through all the steering pivots are a series of rectangles with common corners at the pivot points. The preceding explanation is applicable whenever the tractor semi-trailer combination, or vehicle, is traveling on a perfectly straight line as illustrated on the drawings. Whenever the tractor semi-trailer combination starts turning a curve, the steering mechanism of the semi-trailer 24 is actuated by the turning of the conventional fifth wheel 23 mounted on the road tractor 22; thusly, the T-shaped lever 92 rotates about the pivot pin 93 in inverse proportion to the length of the radius of the curve on which the road tractor 22 is traveling. As the T-shaped lever 92 rotates about its pivot point 93, the bolt 205 across the front of the leg 91 is moved laterally along the arc of a circle. The hinged connection at the bolt 205 is constructed so that the ball 207 in the ball and socket connection will move laterally the same amount as the bolt 205 above; thereby, transmitting a lateral motion to the cross arm 206. As the cross arm 206 moves laterally, the steering mechanism pivots on the bolts 213, 216, 218, and 219, and on the vertical pivot pins 90 simultaneously. The pivots which were the common corners of a series of rectangles now become the common corners of a corresponding series of parallelograms with sides of the geometrical figures remaining the same length while the angular relation changes. In this hookup the pivot points are geometrically arranged so that the steering arms 215 are always parallel to the base of the stub tongues 217, and the "horizontal projections" of the stub tongues 217 are always parallel to the leg 91 of the T-shaped lever 92 above.

On the stub axles 89, the spindle and the steering arm 215 pivot on the vertical pivot pins 90 similar to a crank to steer the dirigible wheels 25. The stub tongues 217 which pivot on the bolts 218 as a fulcrum, must pivot exactly the same angle that the steering arm 215 pivots on the vertical pivot pins 90 because the pivots 218 and 219 are spaced exactly the same distance apart as the pivots 90 and 216, and the pivots 216 and 219 are tied together by the tie rods 186. The center lines of the tie rods 186 are supported level with the center lines of the axles 26 and 28; therefore, the stub tongues 217 at the bolts 219 must always pivot on the tie rods 186, at a point level with the center line of the axles 26 and 28.

Whenever the wheels 25 of the semi-trailer 24 roll across uneven roadway surfaces, the equalizing mechanism distributes the load equally on all the wheels and keeps all the wheels 25 pressed against the uneven roadway surfaces at all times (within limits), and the vertical sleeves 166 of the double-barrel guide 164 slide up and down on the legs of the T-guide structure 155 to keep the axles centered under the semi-trailer 24. This is very good for the equalizing mechanism, but the center lines of the tie rods 186 move up and down and oscillate exactly the same as the center lines of the axles 26 and 28. The lengths of the vertical steering arms 204 are made such that the center lines of the cross arms 206 are level with the center lines of the axles 26 and 28 whenever the semi-trailer 24 is traveling on a perfectly level roadway surface carrying about one half of a normal load. (Note that the flexure of the springs under different loading conditions also effects the interrelation of the steering mechanism near the axles 26 and 28.)

In order to compensate for the relative motion between the cross arms 206 and the tie rods 186 which are mounted on the axles 26 and 28, the stub tongues 217 are made in two parts which pivot on a horizontal pivot pin 220 so that the stub tongues 217 are flexible with respect to vertical forces but are rigid with respect to transverse thrusts.

Base levers 221 are the portions of the stub tongues 217 which pivot on the vertical bolts 218 and 219 as previously explained. Each one of the base levers 221 is made from two bars 222 offset near the center as shown on Fig. 15. The pair of bars 222 are welded on opposite sides of spacer blocks 223 and 224 to form any integral lever having the bars projecting behind the spacer blocks 223 to form a clevis which pivots on the bolt 218 as a fulcrum. Vertical holes are drilled through the bars 222 about midway between the spacer blocks 223 and 224 for the bolt 219 which pivots on the tie rod 186. The front end of the bars 222 project in front of the tie rod 186 where the spacer block 224 is located. A transverse hole is drilled through the center of the spacer block 223 for the horizontal pivot pin 220.

An end lever 225 is the front part, or tongue part on each of the stub tongues 217. The end lever 225 is made from bars 226 which are the same width as the bars 222. The bars 226 have large offsets near the center as shown in Fig. 15 and are tied together by a pair of vertical bars 227 and a pair of arcuate plates 228 welded to each edge. The vertical bars 227 are flush with the back end of the bars 226 and holes are drilled through the centers of the bars 227 to pivot horizontally on the horizontal pivot pin 220. The arcuate plates 228 have their front edges flush with the large offsets and the curved edge on the back is concentric with the horizontal pivot pin 220, with sufficient clearance to revolve around the tie rod 186 while swinging laterally at the same time. The vertical bars 227 fit snug on opposite sides of the base lever 221 and the arcuate plates 228 slide up and down on opposite sides of the spacer block 224 with a running fit. In this manner, the end lever 225 is kept in transverse alignment with the base lever 221 while the end lever 225 pivots on the horizontal pivot pin 220, so that the ends of the stub tongues 217 can swing up and down with respect to the axles 26 and 28 without affecting the horizontal relation between the axles and the tie rods 186.

Fig. 19, Fig. 20, and Fig. 21 show a modified form of the invention, using the identical steering clutch mechanism shown in Fig. 1 through Fig. 4 for the preferred embodiment of the invention.

The modified form of the invention shown in Fig. 19, Fig. 20, and Fig. 21 has the drag links 96 and the cross links 94, which are shown on the preferred form of the invention, rearranged so that the wheels of the semi-trailer 230 are tracking wheels. That is, whenever the rod tractor 22 starts turning a curve, wheels 231 will swing out and follow in the tracks of the rear wheels of the road tractor 22 until the radius of the curve on which the tractor semi-trailer combination is traveling becomes so short that the wheels 231 have reached their steering limits. The steering mechanism is automatically disconnected and the clutch ring 60 is simultaneously locked in place whenever the wheels 231 reach their steering limits, the same as already described for the semi-trailer 24. Whenever the wheels 231 are locked at the angle of their steering limits, they will track at the angle where they are locked, but will trail in enough to continue following the road tractor 22. Whenever the road tractor straightens out enough for the steering clutch to become engaged again, the wheels 231 will resume their tracking relation with the road tractor.

The road tractor 22 in Fig. 1 and Fig. 2 is illustrated with dual-tandem wheels located on opposite ends of two axles. This type of road tractor is shown merely because it is the most common type of road tractor used for hauling heavy semi-trailers. It would be more appropriate to haul the semi-trailer 230 with a road tractor having dual wheels mounted on opposite ends of only one rear axle; however, if the semi-trailer 230 were modified to have two or more axles with the steering synchronized for tracking, the road tractor 22, as illustrated in Fig. 1 and Fig. 2 might be appropriate.

The illustration of the road tractor 22 in Fig. 1 and Fig. 2 is not intended to limit the invention to any particular type of road tractor; but, the semi-trailer 24 and the semi-trailer 230 are intended to be hauled by any conventional road tractor which has a conventional forked type fifth wheel 23.

The wheels 231 for the semi-trailer 230 are mounted on stub axles 89 which pivot on vertical pivot pins 90, with tie rods 186 which pivot on bolts 216 to steer the wheels 231 the same as the description for the dirigible wheels 25 on the semi-trailer 24.

An axle 232 is made the same as axles 26 and 28 except that the short heavy ring 159 in the center of the axle is not needed, and the heavy ring 160 on one end of the axle 232 has two holes drilled for bolts 233 so that ears 234 can be anchored and secure a pin 235 in the eye of a spring 236 so that the pin 235 is at a fixed distance from the center line of the semi-trailer 230. In the other end of the axle 232, a hole is drilled perpendicular to the facets of the heavy ring 160 for bolts 237. Shackle lengths 238 pivot on the bolt 237, and on a pin 239 in an eye of a spring 240 so that the distance between the pin 239 and the pin 235 may vary according to standard practice as the springs 236 and 240 flex up and down. The butt ends of the springs 236 and 240 are pressed into a sleeve 241 and secured by shear bolts 242.

The description of the two large structural members 128 for the deck, or bed, 243 of the semi-trailer 230 is the same as the deck, or bed, 43 for the semi-trailer 24. The front pieces 38 and the transverse members 59, 37, 129, 134, and 135 are exactly the same as the semi-trailer 24. Transverse members 244 and 245 are located behind the transverse members 134 and 135 with a batten plate 246 welded under the flanges for fastening the steering mechanism. A number of transverse members 247 at spaced intervals are located between the transverse member 245 and the large transverse member 146 to support a large steel plate 248 which serves as the floor, or deck, of the semi-trailer in addition to reinforcing the top flanges of the underframing. The description of the large transverse member 146 and 147 with the slots 148 is the same as the description for the semi-trailer 24. Transverse members 249 are located at spaced intervals between the large transverse member 146 and the large transverse member 147, and the ends of the transverse members 249 are butt welded to the inside faces of the large structural members 128 with the top flanges flush. The bottom flanges of the transverse members 249 are sized to rest on the top flanges of longitudinal sill members 250 and the longitudinal sill members 250 have their opposite ends butt welded to the inside faces of the large transverse members 146 and 147 with their bottom flanges flush. The longitudinal sill members 250 are placed symmetrical with respect to the center line of the semi-trailer 230 and rest on opposite ends of a bolster 251. The bolster 251 is made from a pair of structural members with a batten plate 252 welded across the bottom flanges. The batten plate 252 serves as the top side of the sleeve 241 and has holes drilled for the shear bolts 242. The sleeve 241 is completed by welding two short structural channels 253 back to back under the batten plate 252 spaced to fit over opposite sides of the springs 236 and 240, and a cover plate 254 with holes for the shear bolts 242, is welded under the flanges of channels 253. The butts of the springs 236 and 240 are pressed between the batten plate 252 and the cover plate 254 and secured by the shear bolts 242, so that the butts of the springs 236 and 240 will be rigidly secured to the bolster 251.

The transverse bolster over the transverse spring is not the most efficient method of suspension; but, on this type of suspension, there is nothing to prevent the stub axles 89 from rotating ninety degrees each way from normal when they pivot on the vertical pivot pins 90. The most efficient angle to limit the steering for this type of tracking vehicle has not yet been determined; but, it appears that forty-five degrees from the normal would be the proper angle to call the steering limit of the wheels 231.

A batten plate 255 welded across the top of the bolster 251 corresponds to the batten plates 151 above axles 26 and 28 of the semi-trailer 24. A hole is drilled in the center of the batten plate 255 on the center line of the semi-trailer 230 which becomes the pivot point 93. The T-shaped lever 92 is bolted to the batten plate 255 at the pivot point 93 the same as for the semi-trailer 24, and the leg 91 is connected to the tie rod 186 by the steering arm 204, the cross arm 206, and the pair of stub tongues 217. As previously explained for the semi-trailer 24, the dirigible wheels 231 will rotate exactly the same angle about their vertical pivot points 90 that the T-shaped lever 92 rotates about its pivot point 93.

The semi-trailer 230 has the steering clutch housing 29 assembled and bolted to the underframing of the deck, or bed, 243 exactly the same as the semi-trailer 24, except that the steering links 66 are a little shorter because the transverse member 133 is omitted from the semi-trailer 230 which causes the bolt 88 to be placed a little closer to the kingpin 31; but, this does not affect the explanation of the steering mechanism as explained for the semi-trailer 24.

In Fig. 19 the steering mechanism is laid out diagrammatically so that the wheels 231 will rotate the same angle about the vertical pivot pins 90 that the road tractor 22 rotates about the kingpin 31, but in the opposite direction. In order to make the wheels 231 turn in the opposite direction from the road tractor, a second lever bar 260 is added in back of the lever bar 86. A hole is drilled in the batten plate 246 on the center line of the semi-trailer 230 for the bolt 256. The lever bar 260, spaced from the batten plate 246 by a washer 261, pivots on the bolt 256.

Cross links 257 and drag links 258 are both bolted at pivot points 259 with a single bolt. As shown on Fig. 20, the cross arms of the T-shaped lever 92 are made as long as possible to fit between the longitudinal sill members 250 in the rectangular space which was left for the steering mechanism above the bolster 251. The pivot points 95 are equally spaced from the pivot points 93, the pivots 259 have the same spacing from the pivot points 256, and the pivots 97 have the same spacing from the pivot 88. It is obvious that the wheels 231 rotate the same angle but in the opposite direction as the road tractor as was previously stated. If it should be desired to have the wheels 231 turn a different angle than the road tractor, they may be made to steer in any proportion desired by altering the spacing which the ends of the links are spaced from the center line of the semi-trailer 230.

Referring to Fig. 19, Fig. 20, and Fig. 21, the steering links 66 pivot on the bolts 87 above the lever bar 86, and the cross links 257 are bolted at the pivot points 97 below the lever bar 86. By having the cross links 257 bolted above the lever bar 260 at the pivot points 259, the steering mechanism can be stepped down below the underframing while reducing the twist on the lever bars 86 and 260 at the same time. Alternate ends of the cross links 257 are spaced from the lever bars 86 and 260 with washers so that the two cross links 257 can cross each other midway between the lever bars 86 and 260. The cross links 257 fastened above the pivot points 259, are fastened with the same bolt which fastens the drag links 258 below the pivot points 259. The back ends of the drag links 258 are bolted above the arms of the T-shaped lever 92 and the drag links 258 pass through the slots 148 in the large transverse member 146.

In the semi-trailer 24 and semi-trailer 230, the leg 91 of the T-shaped lever 92 is arranged so that the steering arm 204 is hinged on the bolt 205, always in front of the axles. When traveling around curves on level roadways, the ball 207 will move laterally along the arc of a circle directly below the bolt 205.

When traveling around curves on uneven roadway surfaces, the axles rise and fall relative to the vehicle, and relative to the cross arm 206 which is always at the same elevation relative to the vehicle. This causes the end levers 225 of the stub tongues 217 to pivot on the horizontal pivot pins 220. The cross arms 206 rotate with the end levers 225 and swivel at the ball and socket connection which causes the ball 207 to rotate in the sockets. When the axles oscillate about the short heavy pin 162 simultaneously with the rising and falling motion, the cross arm 206 oscillates with the axles which causes the ball 207 to oscillate in the ball and socket connection simultaneously with the swiveling movement caused by the rising and falling of the axles.

The leg 91 of the T-shaped lever 92 rotates about the pivot points 93; whereas, the pair of stub tongues 217 pivot on the bolts 218 so that the center of the ball 207 moves laterally on the arc of a circle at a point midway between the bolts 213. As the cross arm 206 is always parallel to the axles and the steering arm 204 revolves about its vertical center line whenever the vehicle travels around a curve, the ball and socket connection on the ball 207 has three types of motion to take care of, which have an infinite number of simultaneous combinations. The ball and socket at the ball 207 will be in constant motion from one source or the other at all times while the vehicle is traveling; therefore, the ball and socket connection is made rather large and sturdy in order to have a large bearing surface so that it will wear slower from friction. The hollow center in the steering arm 204 is intended primarily to reduce weight; however, this hollow center can be filled with a lubricant such as cup grease and the ball and socket connection will be thoroughly lubricated at all times for years of usage.

Whenever the axles rise or fall, the end levers 225 are canted away from their horizontally disposed position which pulls the cross arms 206 toward the axles with a knee action type of motion. The ball 207 then moves laterally along the arc of a circle which is slightly smaller but is concentric with the aforesaid arc of a circle on which the bolt 205 moves laterally. In fact, the radius of the arc of the circle on which the ball 207 moves laterally is constantly changing while the vehicle is traveling. The variation of this variable radius is proportional to the roughness of the roadway over which the vehicle is traveling. The leg 91 of the T-shaped lever 92 is made relatively long so that the angle which the end levers 225 cant from the horizontal will be relatively small.

The knee action movement described in the preceding paragraph was designed as described and illustrated so that the stub tongues 217 will revolve the same angle about the bolts 218 that the leg 91 revolves about the pivot points 93 as long as the axles are in a horizontally disposed position. Whenever the axles oscillate on the short heavy pins 162, a very difficult problem in analytical geometry is created; but, I have taken care of this very difficult problem by placing the steering arm 204 in front of the axles.

In practice it is impossible to hold the steering mechanism in perfect alignment, because parts become worn and the mechanism is sometimes sprung, or bent, by rough usage while in operation. I have tried to combine the desirable features of the laterally movable axles, which trail along with a colter type of steering behind a pivot point, with the desirable features of dirigible wheels mounted on stub axles, by having the front ends of the stub tongues 217 pivotally secured to the ends of the cross arms 206 so that the steering mechanism of each individual axle will trail along behind the ball and socket connection at the ball 207 similar to the front axle of a four wheel trailer following behind the vehicle which it is trailing. It can be seen by studying Fig. 16 that, if the wheels 25 were slightly out of line because of an unduly large side thrust, the steering arm 204 would hold the ball 207 at the desirable location for keeping the short heavy pin 162 under the center line of the vehicle. The ends of the stub tongues 217 pivot on the bolts 213 which point the stub tongues 217 toward the correct alignment at all times. Even if an axle is located slightly off center, the stub tongues 217 will set up a side drag which constantly tends to push the axle back to its correct center position. When the axles are slightly out of line, the side drag will take up all the slack in the centering mechanism and the T guide structure 155 will spring a little bit toward the corrected center of the axle so that there will be very little skidding of the tires although the wheels are accidently out of line.

Anyone skilled in the art of steering mechanism can see from the preceding description how the steering mechanism on an axle such as axle 28 is misaligned when the axle oscillates about the short heavy pin 162. This misalignment is very slight but increases as the axles move up or down, and increases as the radius of the curve on which the vehicle is traveling becomes smaller. Although this misalignment is very small, it must be corrected. In the semi-trailer 24 and 230 it is corrected by the stub tongues 217 following the ball 207 the same as was previously described for axles accidently off center.

To better understand why the steering element such as the ball and socket at the ball 207 must be placed in front of the axle, assume that the cross arm 206 and the ball 207 in Fig. 16 are in back of the axle 28. Anything which causes the axle 28 to shift a small amount from the center will set up a side drag simultaneously with the stub tongues 217 steering the wheels so that the side drag would pull the axle further away from center. The more the wheels pull out of line, the more the steering mechanism would steer the wheels out of line, and then as the wheels steer more out of line the side drag would become worse. With this constant build up of side thrust the centering mechanism would start to bend, which would cause more side thrust from the side drag on the tires. This side thrust would probably build up so great that any normal size centering mechanism would be broken and might even wreck the vehicle if the elements which control the steering where placed behind the axle.

Reversing this explanation, it appears that the semi-trailer 24 would have trouble backing up. Whenever backing up, the cross bars 206 and the ball 207 will in effect be behind the axles 26 and 28; but, the semi-trailer vehicles are only intended to be backed up for short distances and then at slow speeds. If the dirigible wheels 25 are slightly out of line, backing up occasionally for a block or so will not cause enough vibration and side thrust to bend the centering mechanism, and then the wheels will be steered back into alignment when the vehicle starts forward. When the steering mechanism is properly adjusted, as it should be, the semi-trailer 24 can be backed up with all the wheels on the axles 26, 27, and 28 rolling on concentric curves. There will not be any side drag on the wheels when backing up unless the steering mechanism or the centering mechanism is out of adjustment. Even then, the wheels will straighten up and tend to trail correctly when the vehicle starts forward again.

A semi-trailer with only one axle does not have the enormous vertical movement inherent in tandem axles in equalized suspension; therefore, the semi-trailer 230, as illustrated in Fig. 19, Fig. 20, and Fig. 21 could have the leg 91 of the T-shaped lever 92 much shorter than it is for the semi-trailer 24; or, the semi-trailer 230 could be equipped with a simpler type of steering mechanism for steering the dirigible wheels from the lever bar 260. I used the same type of steering mechanism for both semi-trailers only as a matter of convenience for illustrating and describing the invention.

It should be noted that the steering clutch housing 29 can be removed from underneath the semi-trailer and repaired, or adjusted, and bolted back into place while the semi-trailer is loaded without removing the load whenever the front end of the semi-trailer 24 or 230 is supported on a conventional landing gear.

The landing gear is not part of this invention and is not shown on the drawings; however, any conventional landing gear may be added near the front of the semi-trailer to support the front end of the semi-trailer whenever the road tractor is uncoupled.

The vertical walls on the side of the steering lug 42 are made so long that they will just clear the frame of the road tractor, so that the road tractor can be backed under the semi-trailer for coupling when the lower fifth wheel 23 is at an angle with the kingpin 31 and the steering lug 42. The ends of the forks on the fifth wheel 23 can bump the sides of the steering lug 42 and knock, or push, the steering mechanism into alignment while backing up to engage the automatic latching mechanism of the conventional fifth wheel 23 with the kingpin 31.

While I have shown and described two particular embodiments of my invention, I do not wish to limit myself to the exact forms shown, since the particular construction shown is intended as illustrative rather than delimitive of the invention. The principle underlying my invention can be applied to other forms of steering mechanism known to the art and not hereinabove specifically referred to, illustrated or described. While I have described semi-trailers with a definite number of axles, it is to be understood that the drag links and cross links can be arranged for steering dirigible wheels on any number of axles, either for the trailing type of semi-trailer or the tracking type of semi-trailer.

What I claim is:

1. In a vehicle steering mechanism, a positive locking clutch comprising a driving member and a driven member, steering mechanism connecting the driven member to dirigible wheels of the vehicle so that the dirigible wheels are steered at angles proportional to the angle which the driven member oscillates from its center of oscillation, elements which limit the angles of steering for the dirigible wheels, means for oscillating the driving member, means for latching the driving member to the driven member so that the dirigible wheels of the vehicle will be steered at angles proportional to the angles which the driving member oscillates from its center of oscillation, the means for oscillating the driving member being controlled by forces which sometimes cause the driving member to oscillate beyond the steering limits of the dirigible wheels of the vehicle, a cam surface which controls the latching mechanism for latching and unlatching the driven member to, and from, the driving member, shoulders on the cam surface, means for throwing the latching mechanism and unlatching the driven member from the driving member whenever the dirigible wheels reach their steering limits and the said means strike the shoulders on the cam, means for simultaneously locking the driven member at the instant it is unlatched from the driving member so that the dirigible wheels are locked at their steering limits and the driving member may continue to oscillate to a greater angle without affecting the steering, means for said latching mechanism to latch the driving member onto the driven member at the instant that the driving member oscillates back toward the center of oscillation and carries the aforesaid means for throwing the latching mechanism back past the shoulder on the cam, means for simultaneously unlocking the driven member from the aforesaid locked position at the same instant that the driving member is latched onto the driven member so that the dirigible wheels will continue to be steered by the oscillating of the driving member until the driving member again oscillates beyond the steering limit of the dirigible wheels.

2. An automatic steering clutch comprising a positive locking clutch, the combination of a driving member which is locked to a driven member by automatic latching mechanism, the driving member consisting of a turntable plate which journals on a kingpin, means for fastening the turntable plate to a road tractor so that the turntable plate will oscillate about the kingpin exactly the same angle which the road tractor oscillates about the kingpin when turning in and out of curves, the latching mechanism being assembled on a latching crank, a crank shaft of the latching crank journaled in bearings secured to the turntable plate so that the latching crank always oscillates with the turntable plate, conical rollers journaled on crank pins of the latching crank, the crank pins projecting beyond the conical rollers to serve as latching bars, a cam ring concentric with the kingpin having a cam surface which controls the vertical movement of the conical rollers, the driven member being a clutch ring concentric with the kingpin, means which act as a bearing, or guide, for the clutch ring, means secured to the clutch ring which engage the latching bars when the road tractor oscillates about the kingpin at small angles, means for forcing the conical rollers against the cam surface which keeps the latching bars engaged with the latching means secured to the clutch ring in such a manner that the clutch ring will oscillate with the road tractor within limits on either side of the center of oscillation, the limits of oscillation for the clutch ring being determined by shoulders on the cam ring, the turntable plate oscillating with respect to the cam ring and the shoulders being located at a predetermined angle on opposite sides of the center of oscillation, the latching bars are disengaged from the clutch ring by the vertical movement of the conical rollers as they pass the shoulders whenever the angle which the road tractor oscillates about the kingpin is large enough to swing the conical rollers past the shoulders and the latching bars continue to swing around the kingpin with the road tractor, and means by which the latching bars engage the aforesaid latching means as the conical rollers pass the shoulders whenever the road tractor swings back toward a straight path which swings the rollers past the shoulders.

3. In a steering mechanism for a tractor semi-trailer combination, the combination of a semi-trailer, a road tractor, a fifth wheel mounted on the road tractor, a kingpin under the semi-trailer, means for holding the kingpin in spaced relation with underframing of the semi-trailer, a turntable plate which journals on the kingpin, means for coupling the fifth wheel on the road tractor to the kingpin under the semi-trailer so that the road tractor may pivot about the kingpin with respect to the semi-trailer, the semi-trailer being partially supported by the turntable plate resting on the fifth wheel and partially supported by dirigible wheels, a steering lug fastened underneath the turntable plate, the steering lug being shaped to fit between the forks of the fifth wheel when the tractor is coupled to the semi-trailer so that the turntable plate will pivot about the kingpin exactly the same angle that the road tractor pivots about the kingpin, the road tractor imparting an oscillating motion to the turntable plate when turning into and out of curves, the turntable plate acting as a driving member for an automatic steering clutch, a driven member is latched to the turntable plate when the road tractor is traveling on a straight line or on a curve with a long radius, drag links pivotally connected to the driven member of the automatic clutch, means for synchronizing the steering between the dirigible wheels which partially support the semi-trailer, means for attaching the opposite ends of the aforesaid drag links to the means for synchronizing the steering, means limiting the angles which the dirigible wheels may be steered, means which automatically unlatch the driven member from the turntable plate at the instant when the dirigible wheels reach their steering limits, means which lock the driven member at the angle of oscillation where the dirigible wheels reach their steering limits at the same instant that the driven member is unlatched from the turntable plate whereby the turntable plate being free to oscillate to any angle beyond the angle where the driven mechanism is locked and the road tractor can travel on a curve with a short radius or turn a sharp corner without damaging the steering mechanism, means which automatically latch the driven member to the turntable plate when the road tractor straightens out enough to come within the steering range of the dirigible wheels, and means which automatically unlock the driven member from its locked position at the same instant that the driven member is locked to the turntable plate so that the steering of the dirigible wheels from the fifth wheel is resumed.

4. In a steering mechanism for a tractor semi-trailer combination, the combination of a semi-trailer, a road tractor, a fifth wheel mounted on the frame of the road tractor, the front end of the semi-trailer being supported by the fifth wheel, a kingpin under the front end of the semi-trailer, the fifth wheel being pivotally coupled onto the kingpin, the back end of the semi-trailer being supported on six wheels, the six wheels being mounted on opposite ends of three axles in tandem and in equalized suspension, means for keeping the center of the axles under the center line of the semi-trailer, means for holding the axles transverse of the semi-trailer and in spaced relation therewith, the middle axle is the second axle from the back of the semi-trailer, the middle axle being a stiff axle trails along behind the road tractor, means for pivotally mounting dirigible wheels on opposite ends of each axle for the back axle and the third axle from the back, means for suspending the steering mechanism under the semi-trailer, a lever bar pivotally suspended behind the kingpin, a pair of steering links pivoted to both ends of the lever bar by bolts, means for connecting the steering links to the road tractor so that the lever bar will rotate on the pivot where it is suspended from the semi-trailer exactly the same angle which the road tractor pivots about the kingpin, a T-shaped lever pivotally secured by a bolt above the third axle from the back of the semi-trailer, arms on the T-shaped lever, drag links fastened above the arms of the T-shaped lever at pivot points on the ends of the arms, the opposite ends of the drag links being fastened to the lever bar behind the kingpin at pivot points which are spaced closer together so that the angle which the T-shaped lever rotates about the pivot above the axle will be much less than but proportional to the angle which the road tractor pivots about the kingpin, a leg on the T-shaped lever perpendicular to the arms and extending forward above the third axle from the back, means for steering the dirigible wheels on the said axle from the leg on the T-shaped lever, the back axle of the semi-trailer being the same kind of steering mechanism as the third axle from the back, and cross links having one end attached to pivot points on the ends of the arms over the third axle from the back and the other end of the cross links being attached to pivot points on the ends of the arms over the back axle which causes the T-shaped lever over the back axle to rotate the same angle about the pivot above the axle as the third axle from the back but in the opposite direction so that all of the wheels which support the back end of the semi-trailer roll along concentric curves when the tractor semi-trailer combination is traveling around a curve.

5. In a vehicle steering mechanism, the combination of an axle with dirigible wheels mounted on opposite ends of the axle, vertical pivot pins in each end of the axle, a clevis pivoting on each of the vertical pivot pins, a spindle projecting outward from the clevis on each end of the axle, a steering arm attached to each clevis, the wheels being mounted on the spindles, each end of a tie rod pivotally secured to the ends of the steering arms so that the dirigible wheels are steered in unison, means for suspending the axle under the vehicle so that the axle is free to reciprocate vertically with respect to the vehicle within limits, means which keep the center of the axle under the center line of the vehicle, means for holding the axle transverse of the vehicle and in spaced relation from an end of the vehicle, whereby the axle is free to oscillate simultaneously with the aforesaid reciprocating motion within limits, a T-shaped lever secured to underframing of the vehicle by a vertical pivot pin located above the axle, a leg on the T-shaped lever horizontally disposed and extending longitudinally of the vehicle, a vertical steering arm, means for attaching the vertical steering arm to the leg on the T-shaped lever so that the bottom of the vertical steering arm must move laterally substantially the same as the top moves laterally but the bottom of the vertical steering arm is free to swing longitudinally, means for attaching stub tongues to the axle so that the stub tongues may pivot both vertically and horizontally with respect to the axle, means for attaching the ends of the stub tongues to the bottom of the vertical steering arm with a universal type connection which can swivel as the axles move up and down, twist vertically as the axles oscillate, and twist horizontally as the T-shaped lever revolves on its vertical pivot pin and at the same time permit the vertical steering arm to swivel longitudinally in a knee action type of movement with the stub tongue without affecting the steering relation between the T-shaped lever and the stub tongues, means for connecting the stub tongues to the tie rod so that the T-shaped lever by revolving about its vertical pivot pin will cause the spindles projecting outward from the clevises on each end of the axles to revolve about the vertical pivot pins on the ends of the axles and steer the dirigible wheels, and means by which the T-shaped lever is revolved about the vertical pivot pin in accordance with the angle which the dirigible wheels are to be steered.

6. In a steering mechanism for a vehicle with tandem axles, with the combination on one axle, means for holding the axle transversely of the vehicle and in spaced relation from one end of the vehicle, centering mechanism located on the center of the axle which keeps the center of the axle under the center line of the vehicle, both of the aforesaid means permitting the axle to oscillate about the centering mechanism and to reciprocate with respect to the vehicle in a vertical plane at a fixed distance from one end of the vehicle, means for suspending the axle under the vehicle with load bearing mechanism, a vertical pivot pin secured on each end of the axle, a clevis fitting over each end of the axle and pivoting about the vertical pivot pin, a spindle integral with the clevis projecting outward, wheels mounted on the spindles on each end of the axle, a steering arm attached to each clevis, opposite ends of a tie rod pivoting on the ends of the steering arms, a pair of stub tongues spaced symmetrical on opposite sides of the centering mechanism, the stub tongues consisting of base levers which pivot on the axle with vertically disposed pivot pins and of end levers which pivot on the base lever with horizontally disposed pivot pins, each base lever pivoting on the axle as a fulcrum and pivoting on the tie rod in such a manner that the steering arms always swing the same angle about the vertical pivots on the axle as the base levers swing on the fulcrums, the ends of the base levers projecting beyond the tie rod, a pair of arcuate plates welded on opposite sides of each end lever, the arcuate plates sliding up and down on opposite sides of the projecting ends of the base levers keeping the end levers in transverse alignment with the base levers while the ends of the stub tongues can swing up and down with respect to the axle without affecting the horizontal relation between the axle and the tie rod, the ends of the stub tongues being pivotally connected to opposite ends of a cross arm by bolts which act as vertically disposed pivot pins, the stub tongues being parallel to each other, means for moving the cross arm laterally with respect to the vehicle, the lateral movement of the cross arm swinging the stub tongues about their vertical pivots on the axle and steering the wheels on each end of the axle, the cross arm placed in front of the axle with reference to the normal direction of travel, the said means for moving the cross arm laterally being attached to the vehicle so that the cross arm is always located in front of the position where the wheels should be steered, whereby when the wheels on the axle are slightly misaligned, the cross arm which leads the stub tongues will steer the wheels back into alignment with the vehicle with a colter type of steering.

7. In a stub tongue construction where a tie rod is at the same elevation as an axle and the relative elevation between the end of the stub tongue and the axle varies while performing the steering operation, the combination of a base lever which pivots on the axle with a vertically disposed pivot pin, an end lever which pivots on the base lever with a horizontally disposed pivot pin, the base lever pivoting on the axle as a fulcrum and pivoting on the tie rod with a vertical pivot pin in such a manner that the steering arms and the base lever always swing the same angle about the vertical pivots on the axle, the ends of the base levers projecting beyond the tie rods, a pair of arcuate plates welded on opposite sides of the end lever, the arcuate plates sliding up and down on opposite sides of the projecting ends of the base levers, the end lever being kept in transverse alignment with the base lever while the ends of the stub tongues can swing up and down with relation to the axle while steering dirigible wheels which are pivotally mounted on the ends of the axle.

8. The combination on a vehicle axle, vertical pivot pins in each end of the axle, stub axles pivotally mounted on the vertical pivot pins, wheels mounted on the stub axles, suspension means at each end of said axle for supporting the vehicle, steering arms integral with the stub axles, said steering arms projecting forward from the stub axles, a tie rod in front of the axle, said tie rod pivotally secured to the steering arms, steering means located in front of the axle so that any accidental misalignment of the wheels mounted on the stub axles will steer the wheels back into alignment with a colter type of steering, depending brackets in front of said tie rods, a gooseneck radius rod connecting the axle in back of the tie rod to the depending bracket in front of the tie rod, a double swivel connection fastening the front end of the gooseneck radius rod to the depending bracket, an offset in the gooseneck radius rod so that the gooseneck radius rod passes underneath the tie rod and the axle, a return bend brings the gooseneck radius rod back up to the level of the axle, and a double swivel type connection fastening the hooked end of the gooseneck radius rod to the back side of the axle so that the radius rod fastened to a depending bracket in front of the axle will not interfere with the tie rod which is located in front of said axle.

9. In a tractor semi-trailer combination, the semi-trailer being partially supported by dirigible wheels, a kingpin under the front end of the semi-trailer, steering mechanism revolving concentric with the kingpin, means connecting said steering mechanism with the dirigible wheels of the semi-trailer, an apron plate attached underneath the front end of the semi-trailer, a large circular hole in the apron plate concentric with the kingpin, the bottom part of said steering mechanism consisting of a turntable plate journaled on the kingpin, the turntable plate fitting into the large circular hole in said apron plate and flush across the bottom surface, a fifth wheel mounted on the tractor, a steering lug secured to the bottom of the turntable plate, the steering lug being wedged between forks of the fifth wheel when the tractor is backed under the semi-trailer and the fifth wheel is latched onto the kingpin, the steering mechanism above the turntable plate consisting of an automatic clutch, the automatic clutch comprising means for disconnecting the steering mechanism above the turntable plate at the instant the dirigible wheels partially supporting the semi-trailer reach their steering limits, the turntable plate journaled on the kingpin being free to revolve unrestricted by any limits whatsoever as said steering lug is carried around by the fifth wheel revolving on the kingpin as the tractor jackknifes with the semi-trailer and the turntable plate revolves in the large circular hole in the apron plate without limits.

10. In a steering mechanism for a tractor semi-trailer combination having dirigible wheels of the semi-trailer steered in proportion to the angular relation of the tractor with the semi-trailer, the combination of a road tractor, a fifth wheel mounted on the rear of the road tractor, a kingpin mounted under the front of the semi-trailer, a turntable plate journaled on the kingpin under the front end of the semi-trailer, means for securing the turntable plate to the fifth wheel so that they rotate together about the kingpin, an automatic steering clutch comprising a positive locking clutch with driving member and a driven member, the driving member oscillating with respect to the semi-trailer whenever the angular relation between the road tractor and the semi-trailer changes, the driving member oscillating within limits which greatly exceed the steering limits of the semi-trailer wheels, steering mechanism connecting the driven member with the dirigible wheels of the semi-trailer so that the dirigible wheels are steered in proportion to the movement of the driven member, latching mechanism which latches the driving member to the driven member whenever the driving member oscillates within the steering limits of the semi-trailer wheels, the positive locking clutch containing a cam surface, means for controlling the aforesaid latching mechanism from the cam surface, the latching mechanism being held in the aforesaid latched position by said means while the driving member is oscillating back and forth within the steering limits of the semi-trailer wheels, shoulders located on the cam surface whereby the said means for controlling the latching mechanism from the cam surface will pass a shoulder at the same instant that the semi-trailer wheels reach their steering limits and the driven member of the positive locking clutch will be unlatched from the driving member of the positive locking clutch at the same instant that the semi-trailer wheels reach their steering limits, the cam surface extending beyond said shoulders whereby said means for controlling the latching mechanism from the cam surface will keep the latching mechanism disengaged while said driving member is oscillating within limits which exceed the steering limits of the semi-trailer wheels, means for keeping the driven member of the clutch locked in a fixed position with respect to the semi-trailer while the driving member is oscillating beyond the steering limits of the semi-trailer wheels, the said means for controlling the latching mechanism passing said shoulder as the driving member oscillates back toward the steering limits of the semi-trailer wheels and said shoulder on the cam surface causing the driving member to latch to the driven member at the same instant that the driving member oscillates back to the steering limits of the semi-trailer wheels, means for simultaneously unlocking the driven member from its fixed position on the semi-trailer at the same instant that it is latched to the driving member so that steering of the dirigible wheels may be resumed.

11. In a tractor semi-trailer combination, a fifth wheel mounted on the tractor for latching onto a kingpin under the semi-trailer, the semi-trailer partially supported on dirigible wheels, the semi-trailer having a housing-like construction around the kingpin, an opening in the semi-trailer underframing to receive said housing, a flange around the opening for fastening said housing, said housing having a flange which fastens to the flange around the opening, means for fastening the flange of said housing to the flange around the opening, means securing the kingpin in said housing so that the tractor can support the semi-trailer and exert movement to the semi-trailer through the kingpin and said housing, steering mechanism located inside said housing, means for fastening said steering mechanism to the tractor so that turning motion of the tractor about the kingpin with relation to the semi-trailer will operate said steering mechanism, means for connecting said steering mechanism inside of said housing to the dirigible wheels, said means for connecting said steering mechanism to the dirigible wheels having detachable connections near said housing so that said housing may be removed from underneath the semi-trailer for servicing and repairs and fastened back in place without disturbing, or removing, any load above the deck, or bed, of the semi-trailer.

References Cited in the file of this patent

UNITED STATES PATENTS

| | | |
|---|---|---|
| 2,131,760 | Schaefer | Oct. 4, 1938 |
| 2,286,166 | Carmody | June 9, 1942 |
| 2,342,697 | Runyan | Feb. 29, 1944 |
| 2,359,978 | Edwards | Oct. 10, 1944 |
| 2,662,782 | Wilson | Dec. 15, 1953 |
| 2,675,279 | Heim | Apr. 13, 1954 |
| 2,717,787 | Ward | Sept. 13, 1955 |

FOREIGN PATENTS

| | | |
|---|---|---|
| 451,083 | Germany | Oct. 17, 1927 |
| 883,709 | Germany | July 20, 1953 |